US012602835B2

(12) United States Patent
Oh et al.

(10) Patent No.: US 12,602,835 B2
(45) Date of Patent: Apr. 14, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Hyunmook Oh, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 319 days.

(21) Appl. No.: 17/638,420

(22) PCT Filed: Sep. 24, 2020

(86) PCT No.: PCT/KR2020/012915
§ 371 (c)(1),
(2) Date: Feb. 25, 2022

(87) PCT Pub. No.: WO2021/060850
PCT Pub. Date: Apr. 1, 2021

(65) Prior Publication Data
US 2022/0327743 A1      Oct. 13, 2022

(30) Foreign Application Priority Data
Sep. 24, 2019      (KR) ........................ 10-2019-0117302

(51) Int. Cl.
*G06T 9/00*              (2006.01)
(52) U.S. Cl.
CPC .................................. *G06T 9/001* (2013.01)
(58) Field of Classification Search
CPC ........... G06T 9/001; G06T 3/00; G06T 17/00;
H04N 9/30
See application file for complete search history.

(56) References Cited

U.S. PATENT DOCUMENTS

| | | | | |
|---|---|---|---|---|
| 9,721,385 B2 * | 8/2017 | Herman | .................. | G06T 17/20 |
| 2018/0268570 A1 * | 9/2018 | Budagavi | ................ | G06T 9/001 |
| 2019/0080483 A1 | 3/2019 | Mammou et al. | | |
| 2019/0087979 A1 * | 3/2019 | Mammou | ............ | H04N 19/597 |
| 2019/0139266 A1 * | 5/2019 | Budagavi | .................. | G06T 9/00 |
| 2021/0183110 A1 * | 6/2021 | Zhang | ........................ | G06T 9/00 |
| 2022/0312035 A1 * | 9/2022 | Takahashi | ........ | H04N 21/85406 |

FOREIGN PATENT DOCUMENTS

WO      WO2019012975      5/2020

OTHER PUBLICATIONS

International Search Report in International Appln. No. PCT/KR2020/012915, dated Jan. 12, 2021, 17 pages.
Lopes, "Adaptive Plane Projection for Video-based Point Cloud Coding," Thesis to obtain the Master of Science Degree in Electrical and Computer Engineering, University of Lisbon, Nov. 2018, 114 pages.
Mammou et al., "G-PCC codec description v2," International Organisation for Standardisation, ISO/IEC JTC1/SC29/WG11 N18189, Jan. 2019, Marrakech, MA, 39 pages.

* cited by examiner

*Primary Examiner* — Han Hoang
(74) *Attorney, Agent, or Firm* — Fish & Richardson P.C.

(57)              ABSTRACT

A point cloud data processing method according to embodiments may comprise: encoding point cloud data; and transmitting the encoded point cloud data. A point cloud data processing method according to embodiments may comprise: receiving point cloud data; and decoding the point cloud data.

15 Claims, 37 Drawing Sheets

FIG. 3
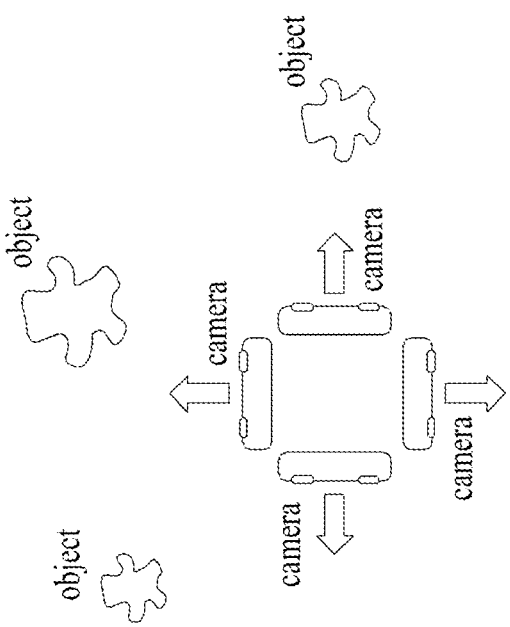
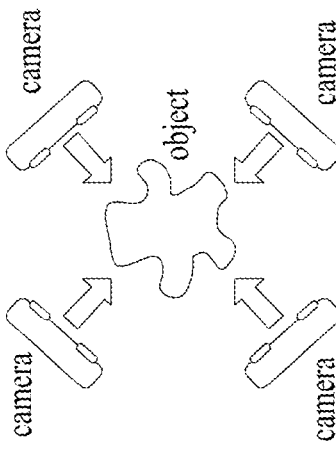

FIG. 7
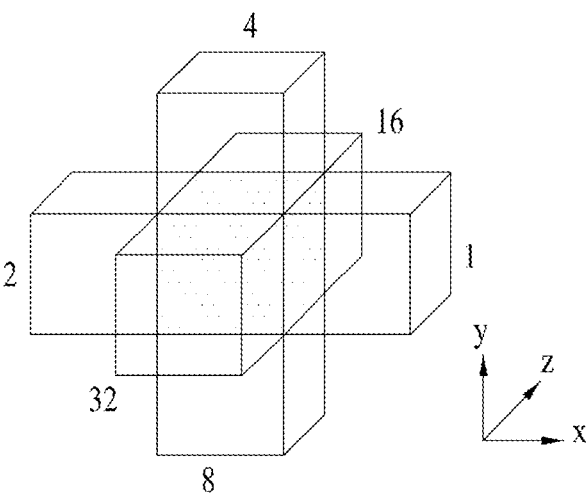
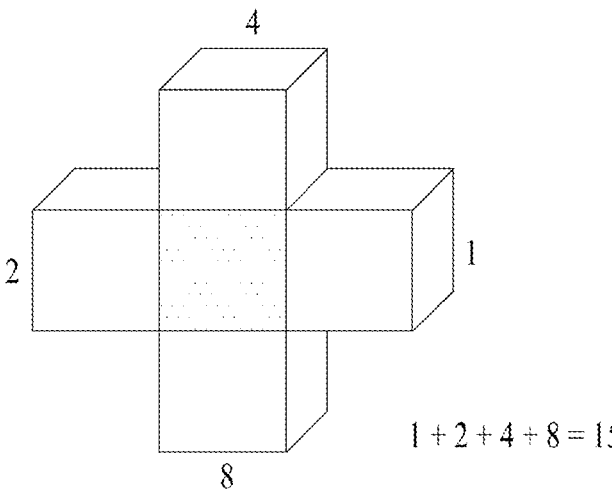
$1 + 2 + 4 + 8 = 15$

Level of details

FIG. 21
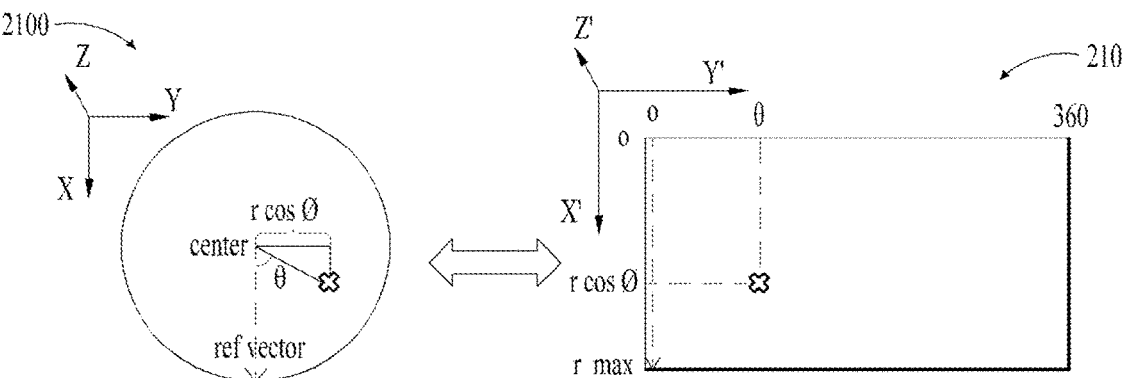
Circular plane of cylindrical coordinate (Z=z')
Rectangular plane (top view) of equi-rect. prism projection(Z' = z')
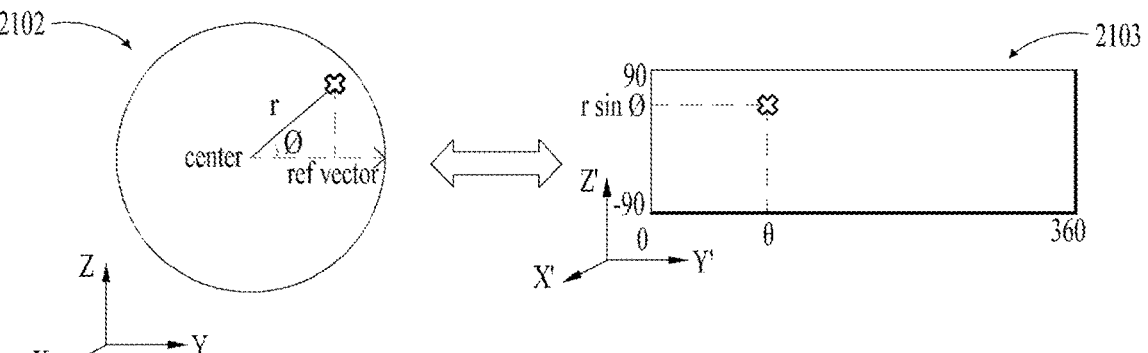
Front view of spherical coordinate (X=0)
Rectangular plane (front view) of equi-rect. prism projection (X' = r)
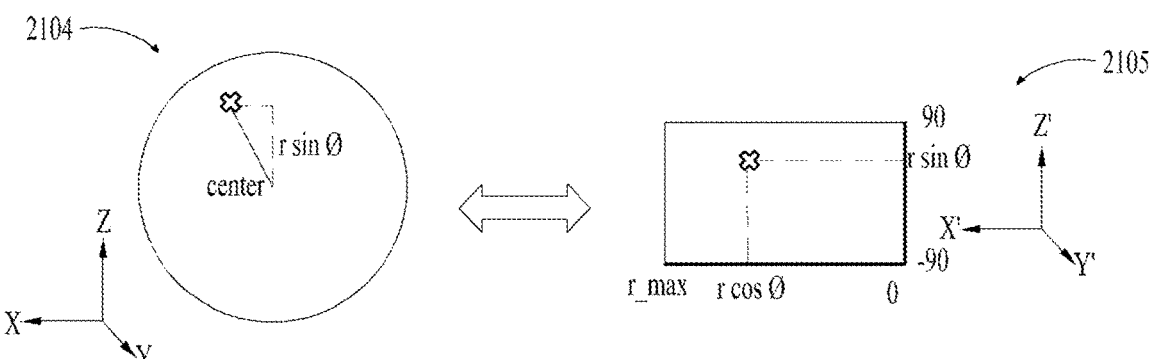
Side view of spherical coordinate(Y=r)
Rectangular plane (side view) of equi-rect. prism projection(Y' = 90)

FIG. 24

| projection_info ( ) { | Descriptor | granurality_normal | ue(v) |
|---|---|---|---|
| projection_info_id | ue(v) | } | |
| projection_type | ue(v) | else if (projection_type == 1) { | |
| geo_projection_enable_flag | u(1) | cylinder_center_x | ue(v) |
| attr_projetion_enable_flag | u(1) | cylinder_center_y | ue(v) |
| bounding_box_x_offset | ue(v) | cylinder_center_z | ue(v) |
| bounding_box_y_offset | ue(v) | cylinder_radius_max1 | ue(v) |
| bounding_box_z_offset | ue(v) | cylinder_radius_max2 | ue(v) |
| bounding_box_x_length | ue(v) | cylinder_degree_max1 | ue(v) |
| bounding_box_y_length | ue(v) | cylinder_degree_max2 | ue(v) |
| bounding_box_z_length | ue(v) | cylinder_z_max | ue(v) |
| orig_bounding_box_x_offset | ue(v) | ref_vector_x | ue(v) |
| orig_bounding_box_y_offset | ue(v) | ref_vector_y | ue(v) |
| orig_bounding_box_z_offset | ue(v) | ref_vector_z | ue(v) |
| orig_bounding_box_x_length | ue(v) | normal_vector_x | ue(v) |
| orig_bounding_box_y_length | ue(v) | normal_vector_y | ue(v) |
| orig_bounding_box_z_length | ue(v) | normal_vector_z | ue(v) |
| rotation_yaw | ue(v) | granurality_radius | ue(v) |
| rotation_pitch | ue(v) | granurality_angular | ue(v) |
| rotation_roll | ue(v) | granurality_normal | ue(v) |
| if (projection_type == 0) { | | } | |
| cylinder_center_x | ue(v) | } | |
| cylinder_center_y | ue(v) | | |
| cylinder_center_z | ue(v) | | |
| cylinder_radius_max | ue(v) | | |
| cylinder_degree_max | ue(v) | | |
| cylinder_z_max | ue(v) | | |
| ref_vector_x | ue(v) | | |
| ref_vector_y | ue(v) | | |
| ref_vector_z | ue(v) | | |
| normal_vector_x | ue(v) | | |
| normal_vector_y | ue(v) | | |
| normal_vector_z | ue(v) | | |
| clockwise_degree_flag | u(1) | | |
| granurality_radius | ue(v) | | |
| granurality_angular | ue(v) | | |

FIG. 25

| seq_parameter_set( ) { | Descriptor |
|---|---|
| profile_compatibility_flags | u(24) |
| level_idc | u(8) |
| sps_bounding_box_present_flag | u(1) |
| if( sps_bounding_box_present_flag ) { | |
| sps_bounding_box_offset_x | se(v) |
| sps_bounding_box_offset_y | se(v) |
| sps_bounding_box_offset_z | se(v) |
| sps_bounding_box_scale_factor | ue(v) |
| sps_bounding_box_size_width | ue(v) |
| sps_bounding_box_size_height | ue(v) |
| sps_bounding_box_size_depth | ue(v) |
| } | |
| sps_source_scale_factor [Ed. TMC13 v6 uses float, but integer is preferred.] | u(32) |
| sps_seq_parameter_set_id | ue(v) |
| sps_num_attribute_sets | ue(v) |
| for( i = 0; i < sps_num_attribute_sets; i++ ) { | |
| attribute_dimension[ i ] | ue(v) |
| attribute_instance_id[ i ] | ue(v) |
| attribute_bitdepth[ i ] | ue(v) |
| attribute_cicp_colour_primaries[ i ] | ue(v) |
| attribute_cicp_transfer_characteristics[ i ] | ue(v) |
| attribute_cicp_matrix_coeffs[ i ] | ue(v) |
| attribute_cicp_video_full_range_flag[ i ] | u(1) |
| known_attribute_label_flag[ i ] | u(1) |
| if( known_attribute_label_flag[ i ] ) | |
| known_attribute_label[ i ] | ue(v) |
| else | |
| attribute_label_four_bytes[ i ] | u(32) |
| } | |
| projection_flag | u(1) |
| if(projection_flag) | |
| projection_info ( ) | |
| sps_extension_present_flag | u(1) |
| if( sps_extension_present_flag ) | |
| while( more_data_in_byte_stream( ) ) | |
| sps_extension_data_flag | u(1) |
| byte_alignment( ) | |
| } | |

FIG. 26

| tile_inventory( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_size_width[ i ] | ue(v) |
| tile_bounding_box_size_height[ i ] | ue(v) |
| tile_bounding_box_size_depth[ i ] | ue(v) |
| projection_flag | u(1) |
| if(projection_flag) | |
| projection_info ( ) | |
| } | |
| byte_alignment( ) | |
| } | |

FIG. 27

| general_attribute_slice_bitstream( ) { | Descriptor |
|---|---|
| attribute_slice_header( ) | |
| attribute_slice_data( ) | |
| } | |

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| if ( aps_slice_qp_delta_present_flag ) { | |
| ash_qp_delta_luma | se(v) |
| ash_qp_delta_chroma | se(v) |
| } | |
| projection_flag | u(1) |
| if(projection_flag) | |
| projection_info ( ) | |
| byte_alignment( ) | |
| } | |

2900

Rectangular plane (top view) of equi-rect. prism projection(Z' = z')

2901

Circular plane of cylindrical coordinate (Z=z')

2902

Rectangular plane (front view) of equi-rect. prism projection (X' = r)

2903

Front view of cylindrical coordinate (X=0)

2904

Rectangular plane (side view) of equi-rect. prism projection(Y' = 90)

2905

Side view of cylindrical coordinate(Y=r)

Figure 34:
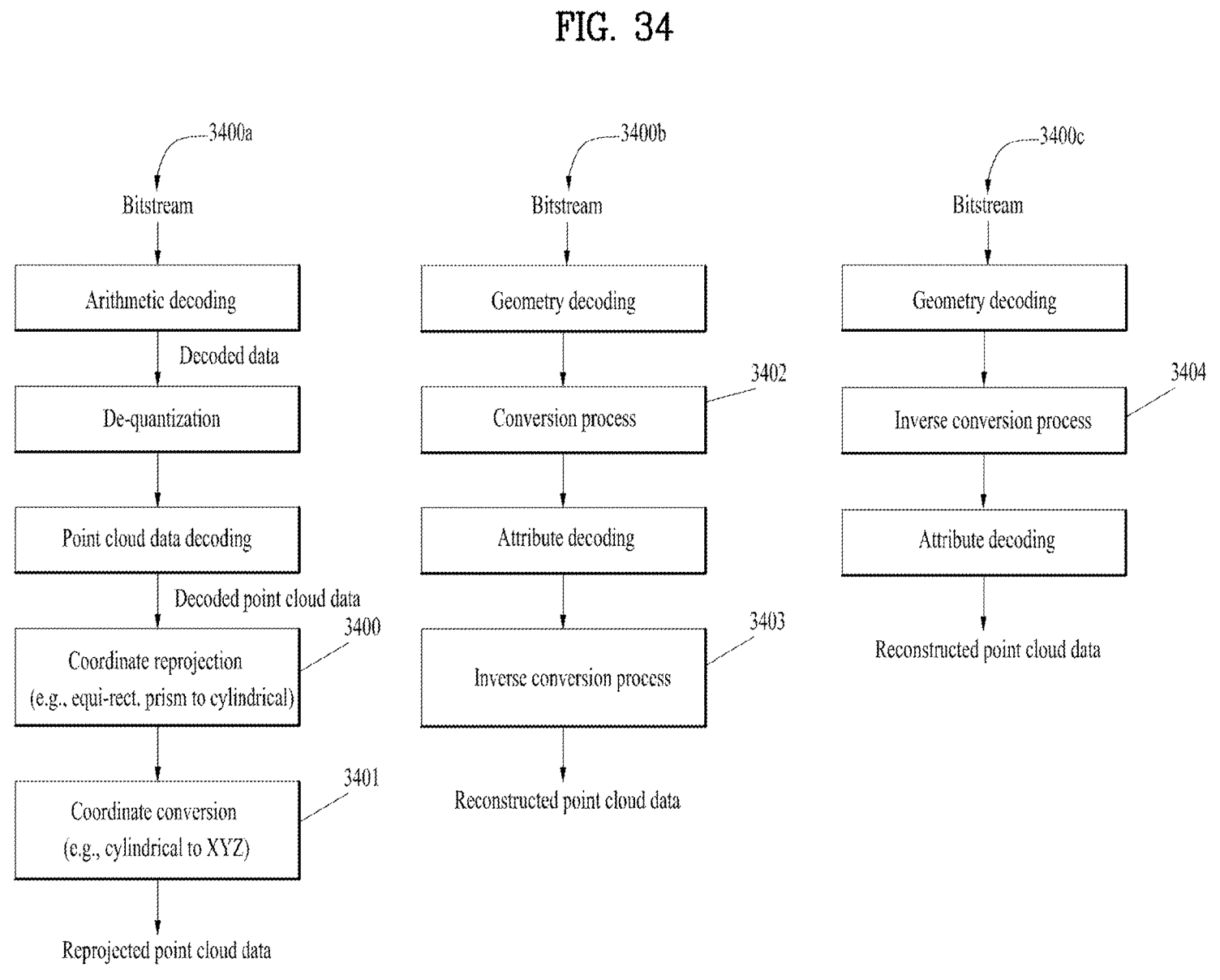

Bitstream →

Geometry decoding →

Inverse conversion process — 3404

→ Attribute decoding →

Reconstructed point cloud data

3400b

Bitstream →

Geometry decoding →

Conversion process — 3402

→ Attribute decoding →

Inverse conversion process — 3403

→ Reconstructed point cloud data

3400a

Bitstream →

Arithmetic decoding

Decoded data →

De-quantization →

Point cloud data decoding

Decoded point cloud data →

Coordinate reprojection (e.g., equi-rect, prism to cylindrical) — 3400

→ Coordinate conversion (e.g., cylindrical to XYZ) — 3401

→ Reprojected point cloud data

1

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2020/012915, filed on Sep. 24, 2020, which claims the benefit of Korean Application No. 10-2019-0117302, filed on Sep. 24, 2019. The disclosures of the prior applications are incorporated by reference in their entirety.

TECHNICAL FIELD

Embodiments relate to a method and apparatus for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide an apparatus and method for efficiently processing point cloud data. Embodiments provide a point cloud data processing method and apparatus for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

Accordingly, in some embodiments, in order to efficiently process point cloud data, a method of transmitting point cloud data includes encoding point cloud data and transmitting a bitstream including the encoded point cloud data.

In some embodiments, a method of receiving point cloud data includes receiving a bitstream including point cloud data and decoding the point cloud data.

Advantageous Effects

Apparatuses and methods according to embodiments may process point cloud data with high efficiency.

The apparatuses and methods according to the embodiments may provide a high-quality point cloud service.

The apparatuses and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts.

FIG. 3 illustrates an exemplary process of capturing a point cloud video according to embodiments;

FIG. 7 shows an example of a neighbor node pattern according to embodiments;

FIG. 21 illustrates an exemplary operation of coordinate projection of point cloud data according to embodiments;

FIG. 24 shows an example of signaling information related to an operation of conversion of point cloud data according to embodiments;

FIG. 25 shows a structure of a sequential parameter set (SPS) of point cloud data according to embodiments;

FIG. 26 shows a structure of a tile inventory of point cloud data according to embodiments;

FIG. 27 shows a structure of an attribute slice header (ash) of point cloud data according to embodiments;

FIG. 34 is a flowchart including an operation of inverse conversion of point cloud data according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
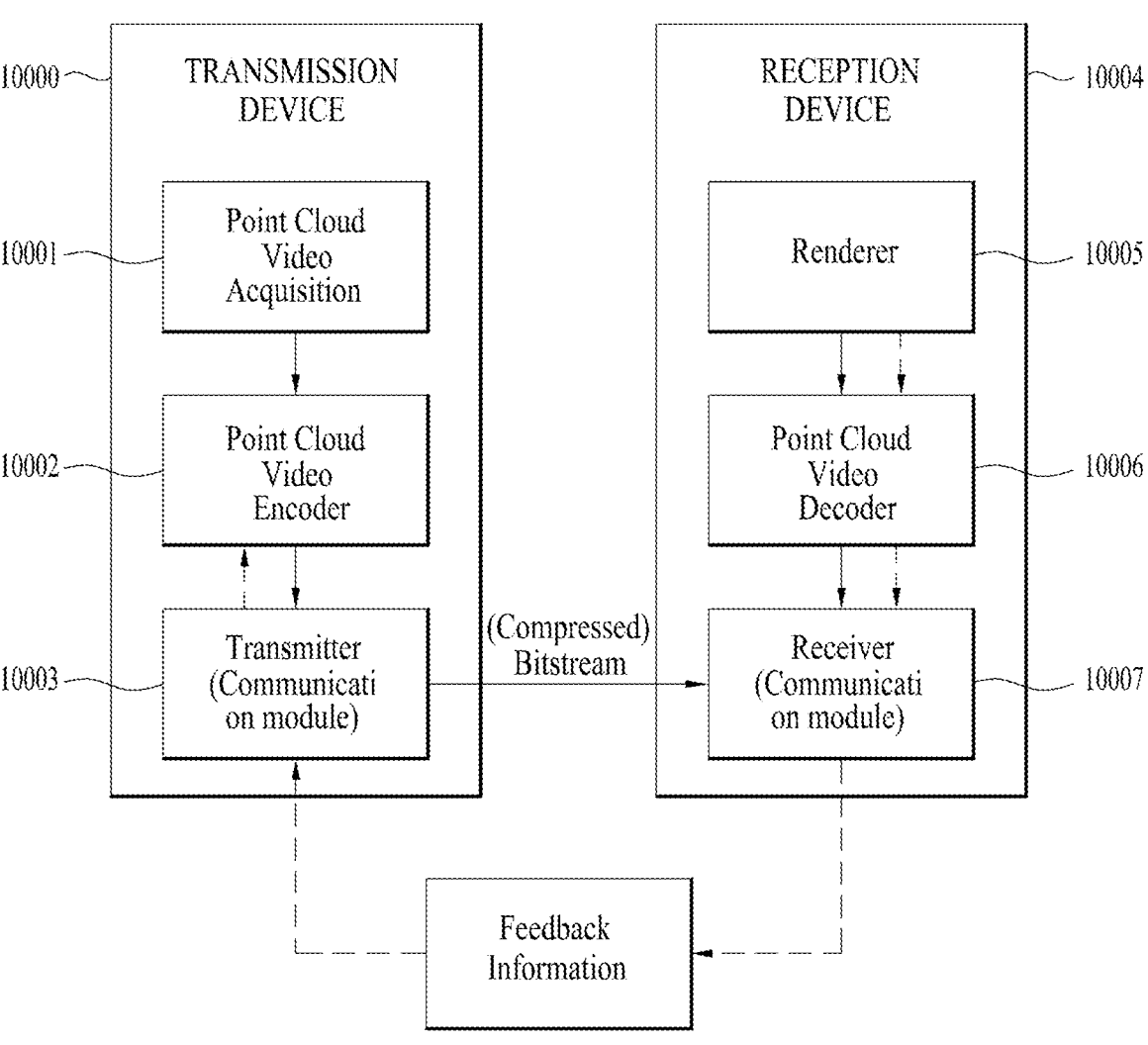
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/ segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/ or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
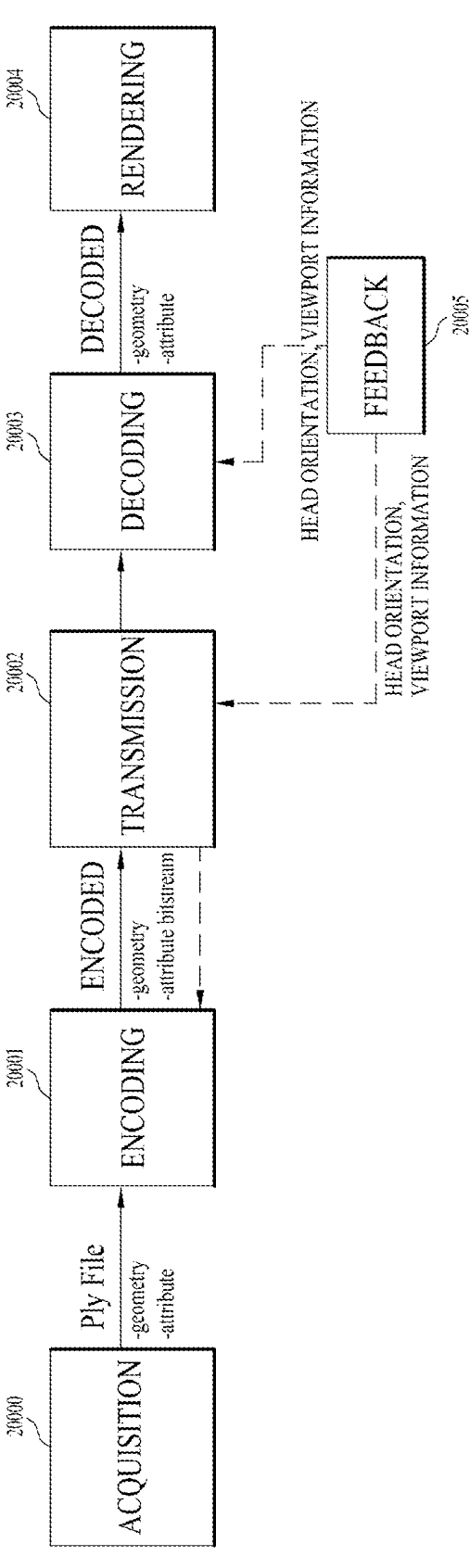
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
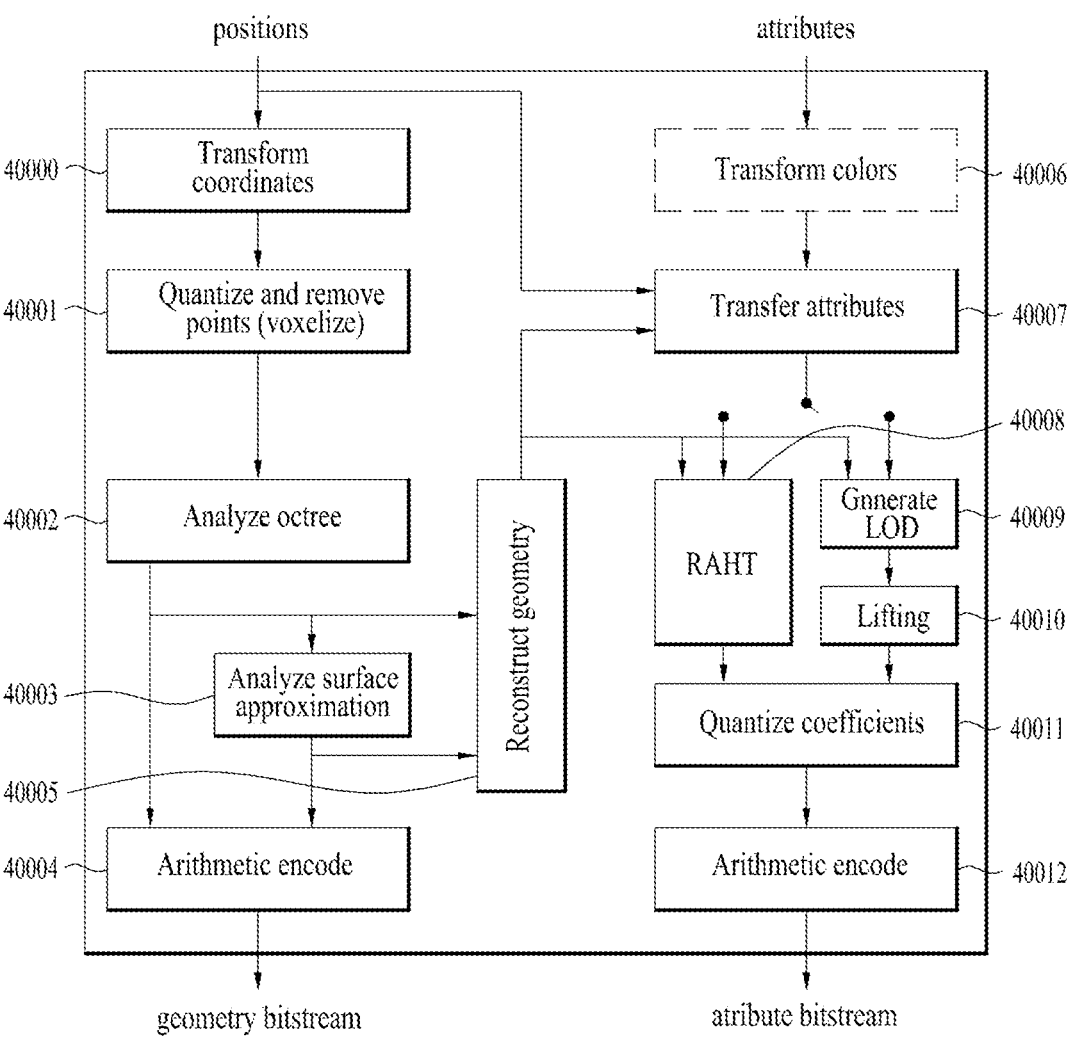
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or on positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1)

is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing apparatus, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
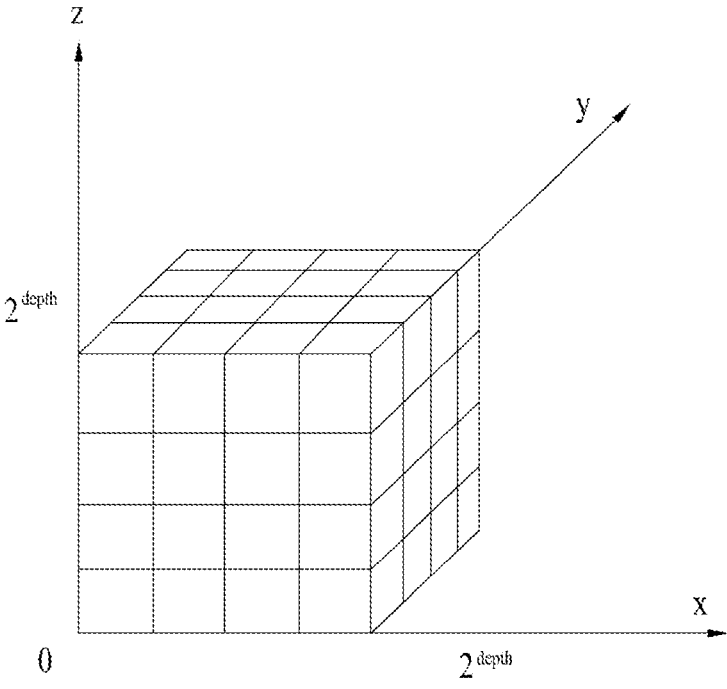
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/ video. The details of the voxel are the same as those described with reference to FIG. 4, and therefore a description thereof is omitted.

Figure 6:
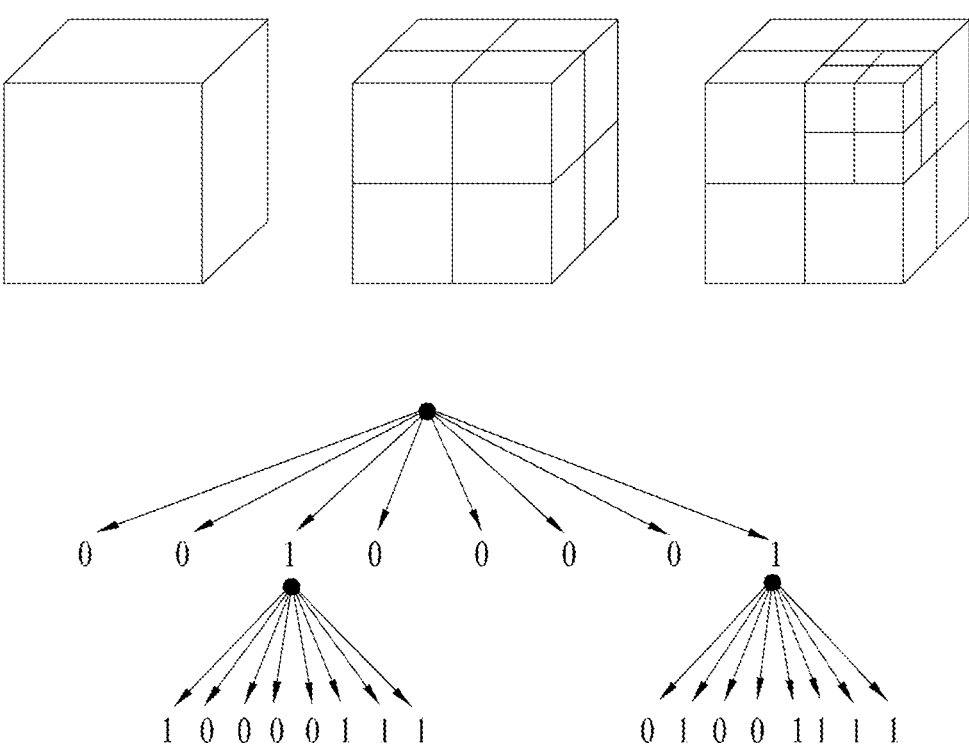
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and (2d, 2d, 2d). Here, 2d may be set to a value constituting the smallest bounding box surrounding all points of the point cloud content (or point cloud video). Here, d denotes the depth of the octree. The value of d is determined in the following equation. In the following equation, (xintn, yintn, zintn) denotes the positions (or position values) of quantized points.

$$d = \text{Ceil}\left(\text{Log2}\left(\text{Max}\left(x_n^{int}, y_n^{int}, z_n^{int}, n = 1, \ldots, N\right) + 1\right)\right)$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter- coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Ax, Ay, Az) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{k=1}^{n} \begin{bmatrix} x_i \\ y_i \\ z_i \end{bmatrix};$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \qquad \text{ii)}$$

$$\begin{bmatrix} \sigma_x^2 \\ \sigma_y^2 \\ \sigma_z^2 \end{bmatrix} = \sum_{k=1}^{n} \begin{bmatrix} \bar{x}_i^2 \\ \bar{y}_i^2 \\ \bar{z}_i^2 \end{bmatrix} \qquad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE Triangles formed from vertices ordered 1, . . . , n

TABLE 1

| n | Triangles |
|---|-----------|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |

TABLE 1-continued

| n | Triangles |
|---|-----------|
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values). FIG. 7 shows an example of a neighbor node pattern according to embodiments. In order to increase the compression efficiency of the point cloud video, the point cloud encoder according to the embodiments may perform entropy coding based on context adaptive arithmetic coding. As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using $2^3$ (=8) methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The up part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The down part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
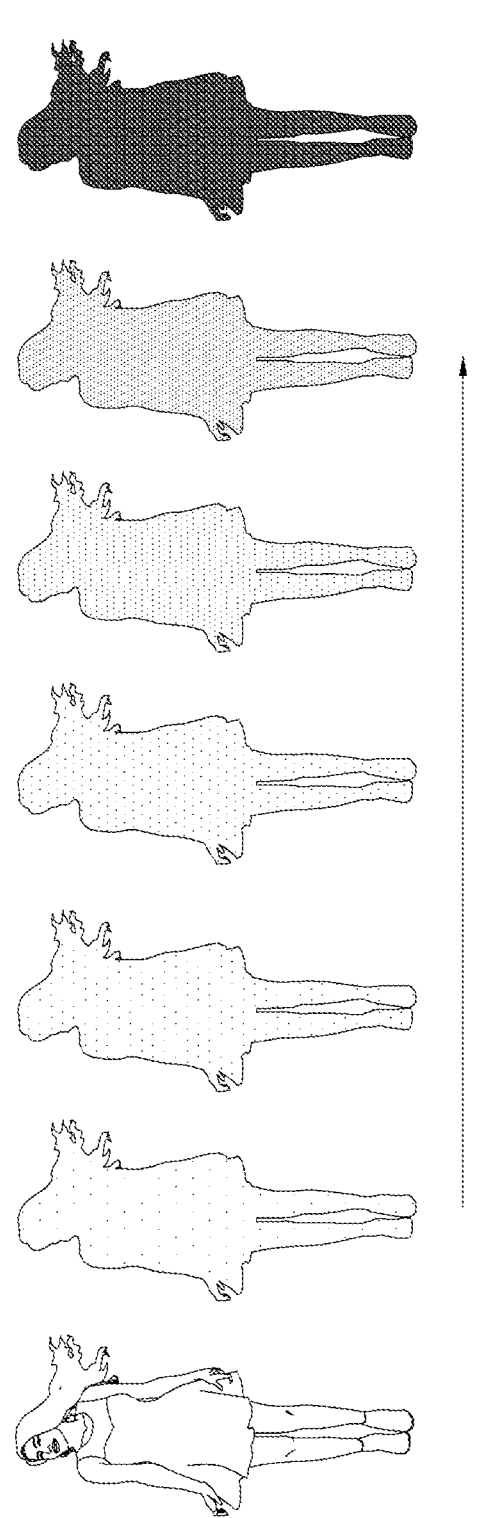
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
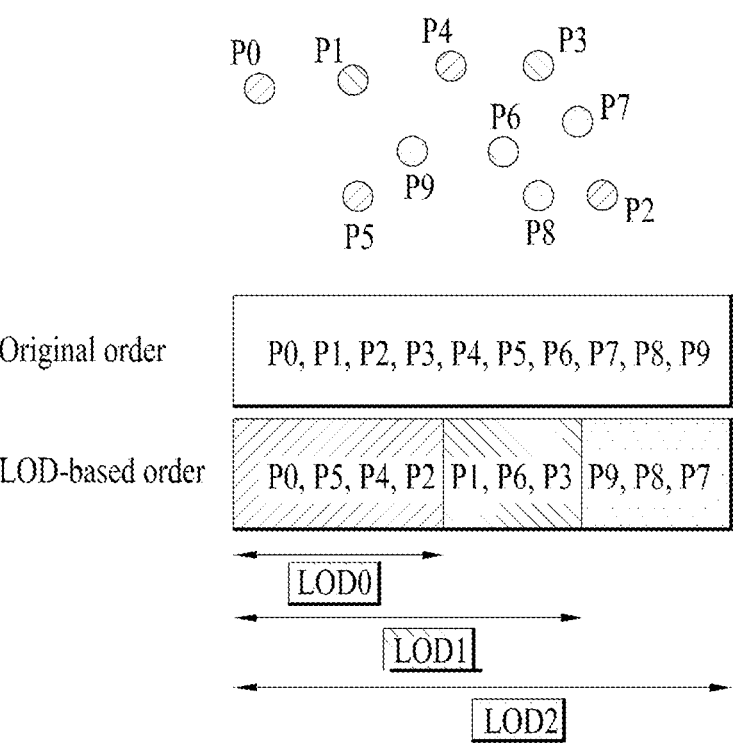
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of a point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE Attribute prediction residuals quantization pseudo code

TABLE 2

```
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE Attribute prediction residuals inverse quantization pseudo code

TABLE 3

```
int PCCInverseQuantization(int value, int quantStep) {
if( quantStep == 0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation. The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows. 1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication. 2) Lift prediction process: Subtract the value obtained by multiplying the attribute value of the point by the weight from the existing attribute value to calculate a predicted attribute value. 3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
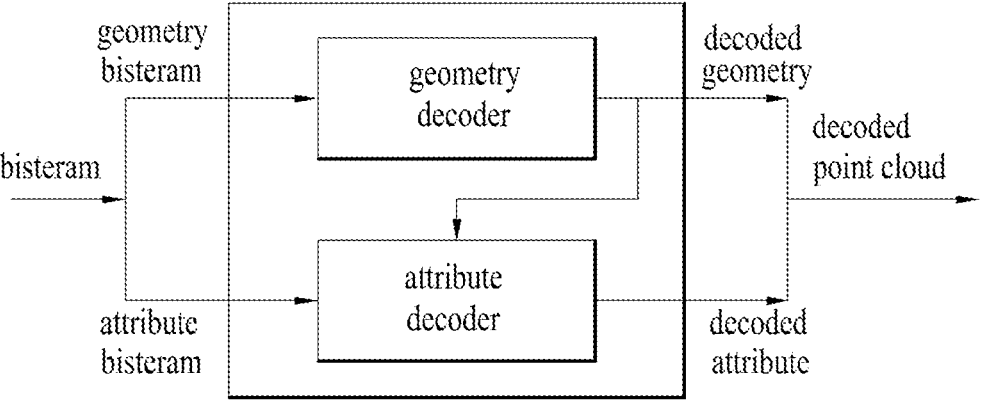
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
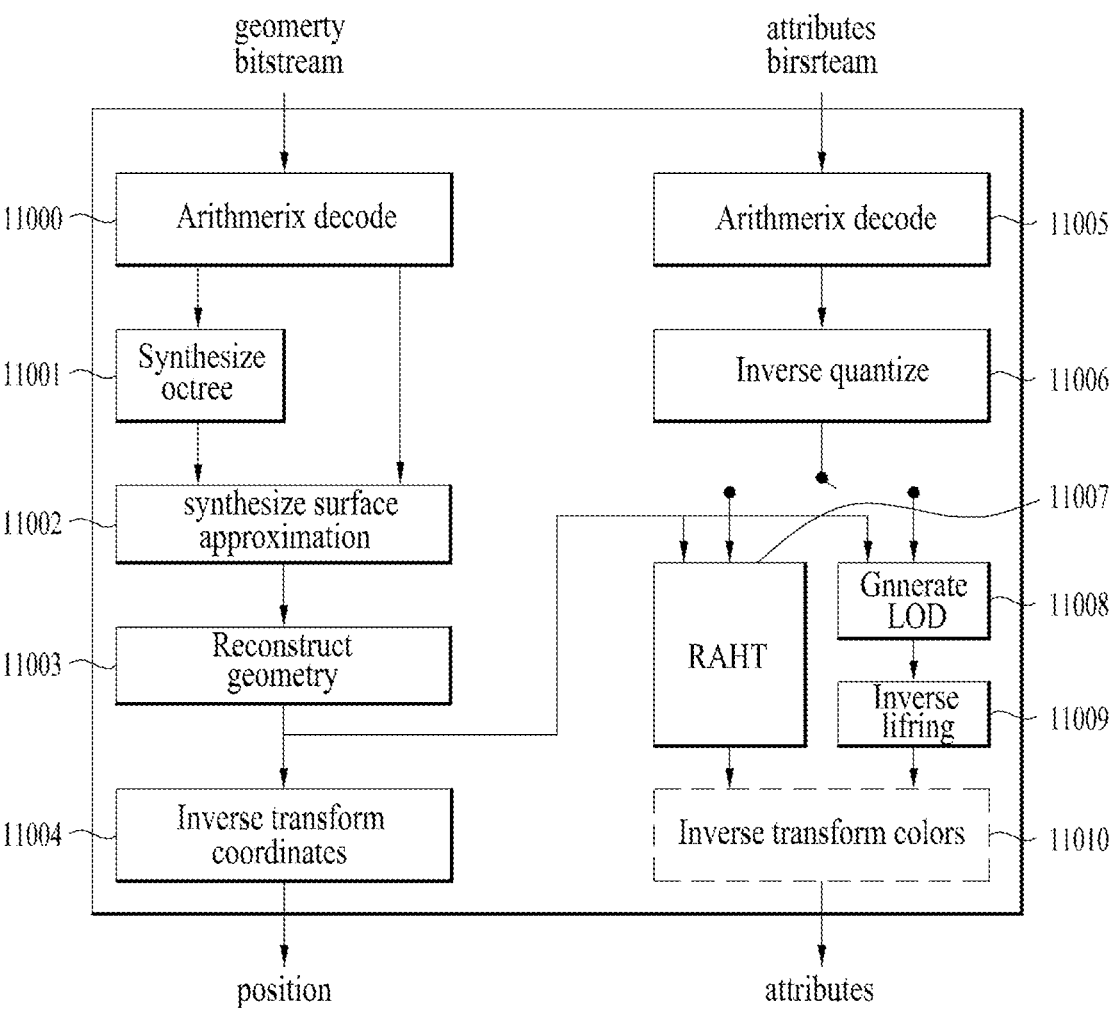
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing apparatus, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
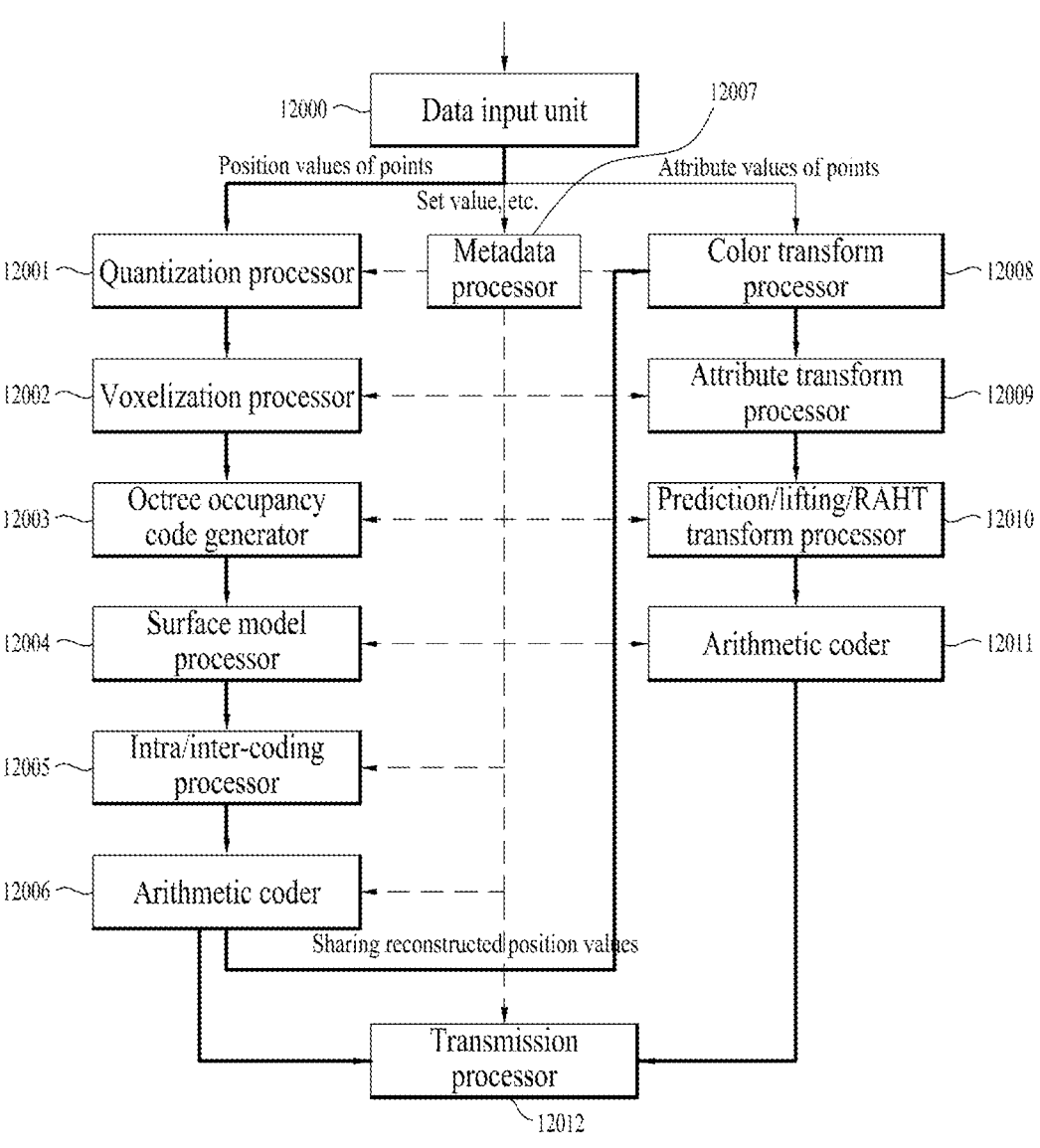
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigroup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
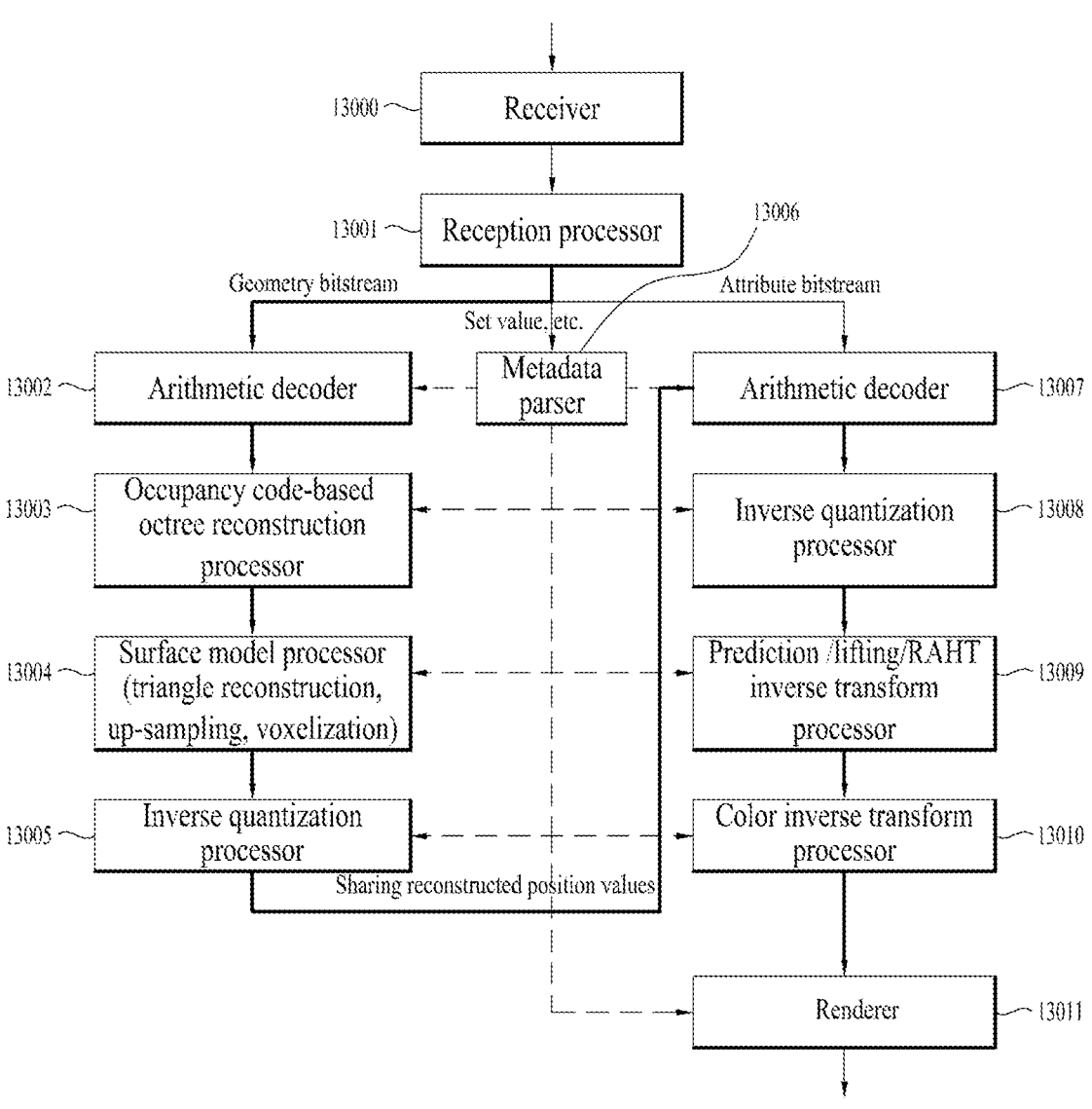
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
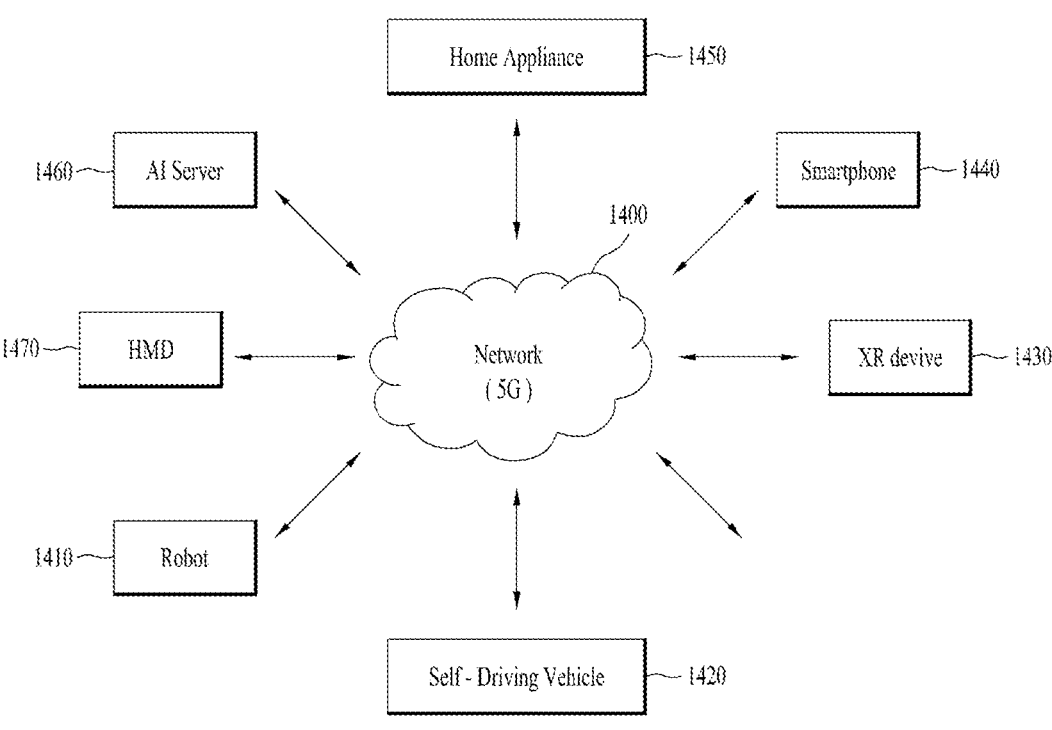
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
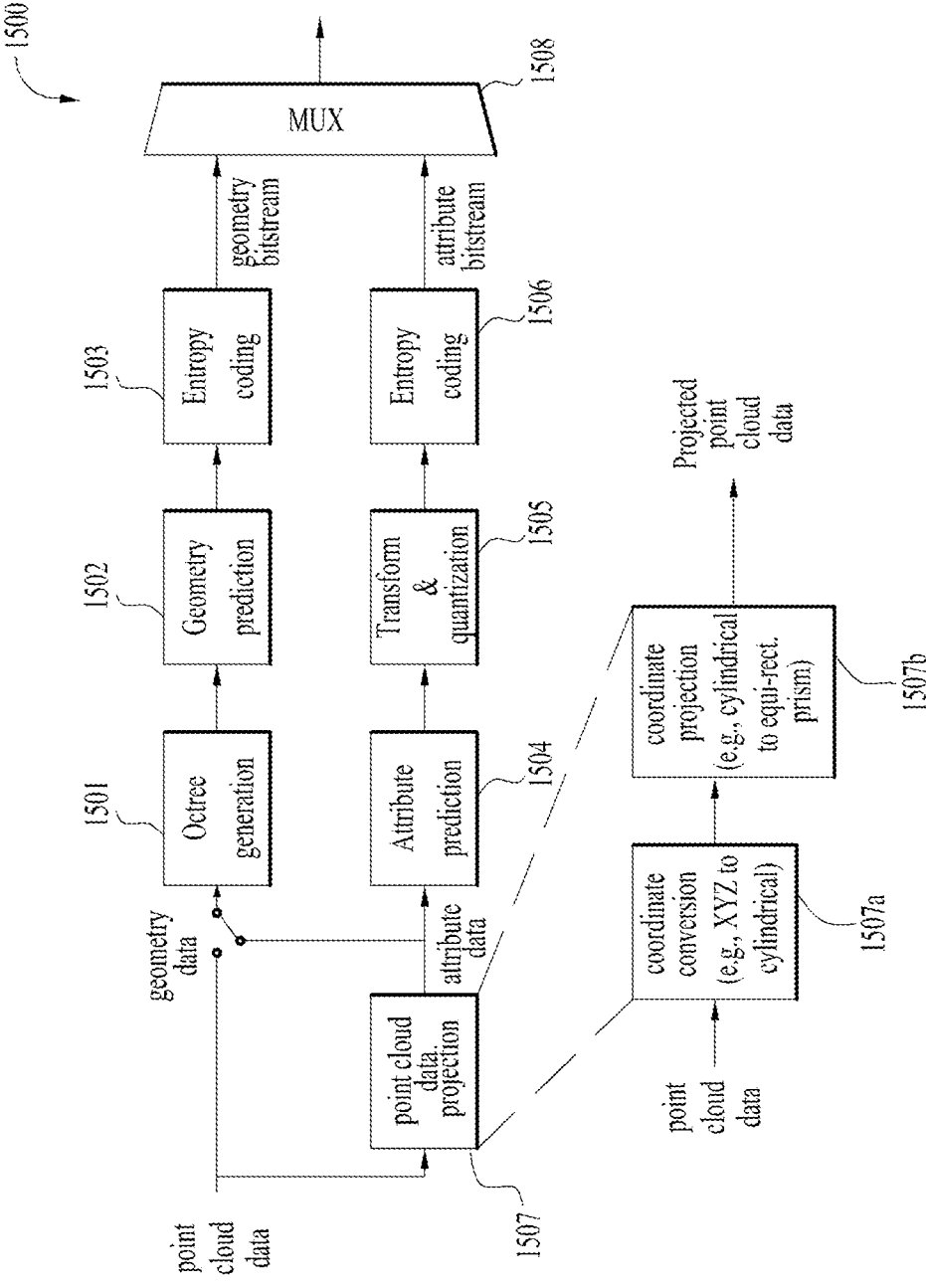
FIG. 15 is a block diagram illustrating a point cloud data transmission device according to embodiments.

FIG. 15 is a block diagram illustrating a point cloud data transmission device according to embodiments;

The point cloud data transmission device 1500 (e.g., the point cloud video encoder 10002 of FIG. 1, the point cloud encoder of FIG. 4, and the point cloud encoder described with reference to FIG. 12) according to the embodiments may perform the encoding operation described with reference to FIGS. 1 to 14. The point cloud data transmission device may include an octree generator (Octree generation) 1501, a geometry predictor (Geometry prediction) 1502, an entropy coder (Entrophy coding) 1503, an attribute predictor (Attribute prediction) 1504, a transform/quantization unit (Transform & quantization) 1505, an entropy coder (Entrophy coding) 1506, a projector (point cloud data projection) 1507, and/or a multiplexer (MUX) 1508. Although not shown in FIG. 15, the point cloud data transmission device may further include one or more elements configured to perform the encoding operation described with reference to FIGS. 1 to 14. Each element in this figure may correspond to hardware, software, a processor, and/or a combination thereof.

Point cloud (PCC) data or point cloud compression (PCC) data is input data to the point cloud transmission device 1500 and may include geometry and/or attributes. The geometry is information indicating a position (e.g., a location) of a point, and may be represented as parameters of coordinates such as orthogonal coordinates, cylindrical coordinates, or spherical coordinates. The attribute represents an attribute (e.g., color, transparency, reflectance, grayscale, etc.) of a point. The geometry may be referred to as geometry information (or geometry data), and the attribute may be referred to as attribute information (or attribute data).

The octree generator structures geometry information of input point cloud data for geometry coding into a structure such as an octree. The geometry information is structured based on at least one of an octree, a quadtree, a binary tree, a triple tree, or a k-d tree.

The geometry predictor according to the embodiments codes the structured geometry information.

The entropy coder 1503 entropy-codes the coded geometry information and outputs a geometry bitstream.

The octree generator, the geometry predictor, and the entropy coder 1503 perform the geometry coding (or geometry encoding) described with reference to FIGS. 1 to 14. The operations of the octree generator, the geometry predictor, and the entropy coder 1503 are the same as or similar to the operations of the coordinate transformer 40000, the quantizer 40001, the octree analyzer 40002, the surface approximation analyzer 40003, the arithmetic encoder 40004, and the geometry reconstructor (Reconstruct Geometry, 40005). Also, the operations of the octree generator, the geometry predictor, and the entropy coder 1503 are the same as or similar to the operations of the data input unit 12100, the quantization processor 12001, the voxelization processor 12002, the octree occupancy code generator 12003, the surface model processor 12004, the intra/inter-coding processor 12005, the arithmetic coder 12006, and the metadata processor 12007 described with reference to FIG. 12.

The attribute predictor receives attribute information and performs attribute coding thereon.

The transform/quantization unit performs attribute transform and/or quantization on the attribute-coded attribute information.

The entropy coder 1506 entropy-codes the transformed and/or quantized attribute information and outputs an attribute bitstream.

The attribute predictor, the transform/quantization unit, and the entropy coder 1506 according to the embodiments perform attribute encoding (or attribute coding). The operations of the attribute predictor, the transform/quantization unit, and the entropy coder 1506 are the same as or similar to the operations of the geometry reconstructor 40005, the color transformer 40006, the attribute transformer 40007, and the RAHT transformer 40008, the LOD generator 40009, the lifting transformer 40010, the coefficient quantizer 40011, and/or the arithmetic encoder 40012 described with reference to FIG. 4. Also, the operations of the attribute predictor, the transform/quantization unit, and the entropy coder 1506 are the same as or similar to the operations of the color transform processor 12008, the attribute transform processor 12009, the prediction/lifting/RAHT transform processor 12110, and the arithmetic coder 12011 described with reference to FIG. 12.

As shown in FIGS. 1 to 14, the attribute encoding according to the embodiments may include color transform coding, attribute transform coding, RAHT coding, prediction transform coding, and lifting transform coding. The RAHT coding, prediction transform coding, and lifting transform coding may be selectively used or a combination of one or more thereof may be used, depending on the point cloud content. The attribute encoding is not limited to the above-described example.

The projector according to the embodiments may convert positions (or geometry) of points of point cloud data. For example, the projector may convert the positions of the points of the point cloud data (e.g., point cloud data collected by LiDAR) acquired with a predetermined pattern to uniformly change the distribution of the points of the point cloud data. Accordingly, the point cloud data transmission device according to the embodiments may enhance coding efficiency by performing geometry/attribute coding based on the converted geometry.

The projector according to the embodiments may include a coordinate conversion unit 1507a and/or a coordinate projection unit 1507b. The projector may further include one or more elements to perform an operation of converting the positions of the points.

The coordinate conversion unit according to the embodiments may convert the coordinates indicating the positions of the points presented in a first coordinate system (e.g., the Cartesian coordinate system) into a second coordinate system (e.g., spherical coordinates or cylindrical coordinates). The coordinate projection unit according to the embodiments may convert the positions of the points based on the coordinates indicating the converted positions of the points presented in the second coordinate system (e.g., spherical coordinates or cylindrical coordinates). For example, the coordinate projection unit may change the positions of the points based on the coordinates indicating the positions of the points converted into the second coordinate system (e.g., spherical coordinates or cylindrical coordinates) and the scale values for the respective axes of the second coordinate system.

The geometry converted by the projector according to the embodiments may be used in the above-described geometry encoding (e.g., the geometry encoding operation described with reference to FIGS. 1 to 14) and/or attribute encoding (e.g., the attribute encoding operation described with reference to FIGS. 1 to 14). When the converted geometry according to the embodiments is used in the geometry encoding and attribute encoding, the geometry bitstream and the attribute bitstream may be based on the converted geometry. For example, both the geometry encoding and the attribute encoding may be performed based on the converted geometry. When the converted geometry according to the embodiments is used in the geometry encoding (not shown in this figure), the geometry bitstream may be based on the converted geometry, but the attribute bitstream may be based on the geometry before the conversion. For example, the geometry encoding may be performed based on the converted geometry, but the attribute encoding may be performed based on the geometry before the conversion. When the converted geometry according to the embodiments is used in the attribute encoding (not shown in this figure), the attribute bitstream may be based on the converted geometry, but the geometry bitstream may be based on the geometry before the conversion. For example, the attribute encoding may be performed based on the converted geometry, but the geometry encoding may be performed based on the geometry before the conversion.

The multiplexer according to the embodiments may transmit a geometry bitstream and/or an attribute bitstream, respectively, or may configure one bitstream from the geometry bitstream and/or the attribute bitstream and transmit the same. The operation of the multiplexer is the same as or similar to that of the transmission processor 12012 of FIG. 12.

The point cloud data transmission device according to the embodiments may perform coding based on the converted geometry. Accordingly, the point cloud data transmission device may secure a higher coding gain by increasing coding efficiency by using the converted geometry (e.g., the geometry having a uniform distribution).

Figure 16:
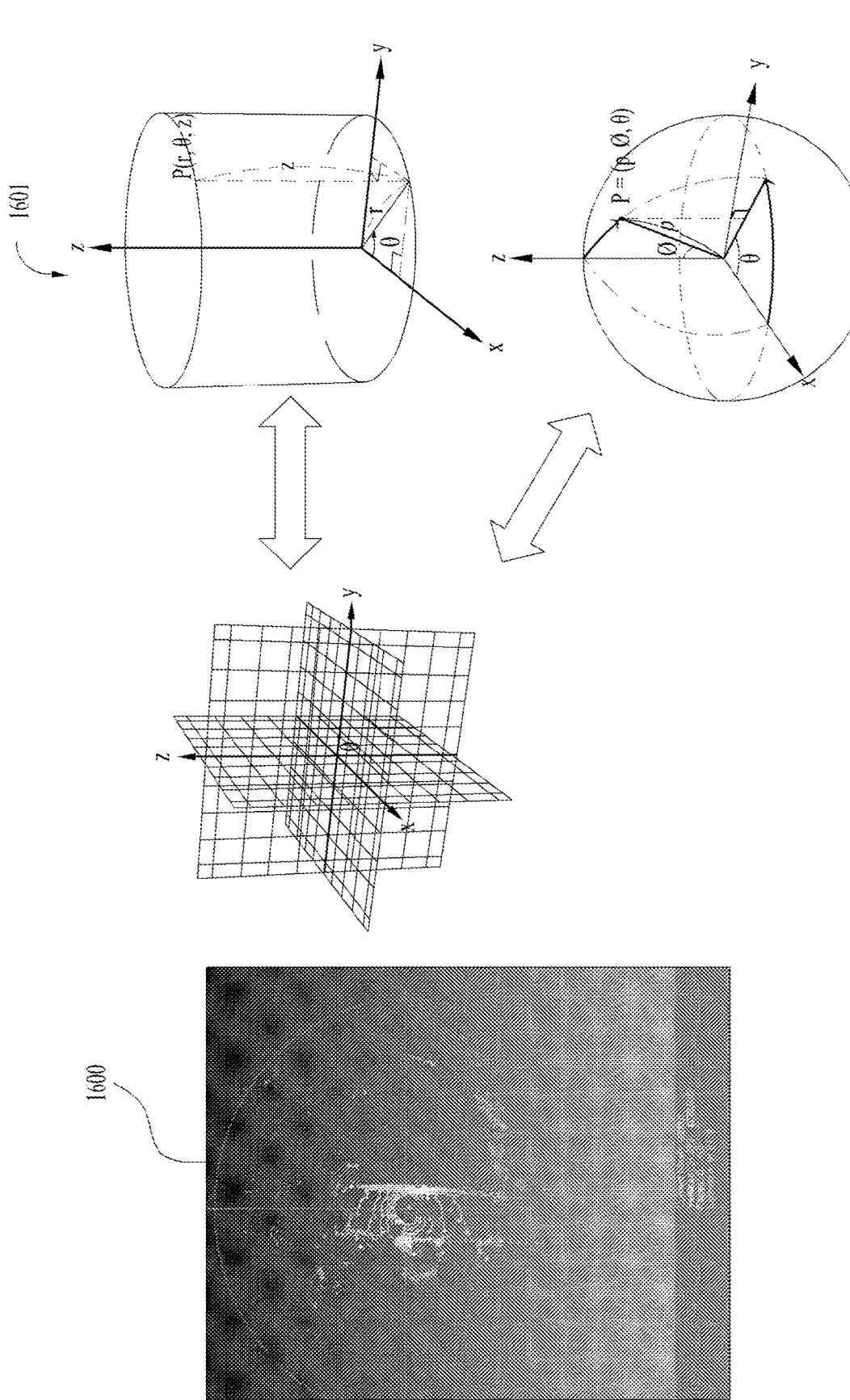
FIG. 16 illustrates an exemplary operation of conversion of point cloud data according to embodiments.

FIG. 16 illustrates an exemplary operation of conversion of point cloud data according to embodiments.

This figure illustrates an exemplary operation of converting point cloud data by the point cloud data transmission device (e.g., the point cloud video encoder 10002 of FIG. 1, the transmission device 1500 of FIG. 15, the projector 1507 of FIG. 15, or the coordinate conversion unit 1507a of FIG. 15) according to the embodiments.

The point cloud data transmission device (e.g., the point cloud video acquirer 10001 of FIG. 1) according to the embodiments may acquire a point cloud video (e.g., the point cloud video of FIG. 1). The transmission device may acquire the point cloud video using LiDAR. The transmission device may acquire the point cloud video based on the outward-facing technique (e.g., the outward-facing technique of FIG. 3) using LiDAR.

The point cloud data acquired through LiDAR may be referred to as LiDAR data. An example 1600 of LiDAR data is shown on the left side of this figure. The LiDAR according to the embodiments may acquire LiDAR data based on reflection of light emitted from one or more lasers arranged in a rotating LiDAR header. Accordingly, the LiDAR data may be configured in a cylindrical shape. The distance between the light rays emitted by the one or more lasers increases as the distance from the LiDAR increases. Accordingly, the LiDAR data according to embodiments may have a cylindrical shape in which points are sparsely distributed as the distance from the LiDAR header increases. When the encoding operation is performed based on the geometry of points which are not uniformly distributed as shown in the example 1600 on the left side of this figure, coding efficiency may be degraded. For example, in the case where the encoding operation is performed based on the geometry of points which are not uniformly distributed, the transmission device may fail to search for points distributed at a close distance from a specific point.

Accordingly, the transmission device (e.g., the projector 1507 of FIG. 15) according to the embodiments may convert the positions of the points of the point cloud data (e.g., LiDAR data) to make the distribution of the points of the point cloud data uniform.

Shown on the right side 1601 of this figure is an operation in which the transmission device (e.g., the projector 1507 of FIG. 15 or the coordinate conversion unit 1507a of FIG. 15) according to the embodiments converts coordinates indicating positions of points presented in the first coordinate system (e.g., the Cartesian coordinate system) into the second coordinate system (e.g., spherical coordinates or cylindrical coordinates). The positions of the points of the point cloud data (e.g., LiDAR data) acquired by the transmission device may be represented as Cartesian coordinates. Accordingly, the positions of the points of the point cloud data acquired by the transmission device may be represented by parameters (e.g., coordinate values of the x-axis, y-axis, and z-axis) representing the Cartesian coordinate system. The transmission device may convert the coordinates indicating the positions of the points presented in the Cartesian coordinate system into cylindrical coordinates or spherical coordinates.

The transmission device according to the embodiments (e.g., the projector 1507 of FIG. 15 or the coordinate conversion unit 1507a of FIG. 15) may convert the coordinates indicating the positions of points presented in the Cartesian coordinate system into cylindrical coordinates. That is, the transmission device may convert the coordinates indicating the positions of points represented by parameters representing the Cartesian coordinate system (e.g., coordinate values of the x-axis, y-axis, and z-axis) into parameters (e.g., r, $\theta$, and z) representing the cylindrical coordinate system. For example, the operation of the transmission device of converting the x-axis value, the y-axis value, and the z-axis value in the Cartesian coordinate system into the values of r, $\theta$, and z in the cylindrical coordinate system may be represented as follows.

$$r = \sqrt{x^2 + y^2}\,;\, \theta = \tan^{-1}\left(\frac{y}{x}\right);\, z = z.$$

The transmission device according to the embodiments (e.g., the projector 1507 of FIG. 15 or the coordinate conversion unit 1507a of FIG. 15) may convert the coordinates indicating the positions of points presented in the Cartesian coordinate system into spherical coordinates. That is, the transmission device may convert the coordinates indicating the positions of points represented by parameters representing the Cartesian coordinate system (e.g., coordinate values of the x-axis, y-axis, and z-axis) into parameters (e.g., $\rho$, $\Phi$, and $\theta$) representing the spherical coordinate system. For example, the operation of the transmission device of converting the x-axis value, the y-axis value, and the z-axis value in the Cartesian coordinate system into the values of $\rho$, $\Phi$, and $\theta$ in the spherical coordinate system may be represented as follows.

$$\rho = \sqrt{x^2 + y^2 + z^2}\,;\, \Phi = \tan^{-1}\left(\frac{y}{x}\right);\, \theta = \cos^{-1}\left(\frac{y}{\sqrt{x^2 + y^2 + z^2}}\right).$$

The coordinate conversion unit 1507a may transmit the coordinates indicating the positions of the points converted into and represented as cylindrical coordinates or spherical coordinates to the coordinate projection unit 1507b. The coordinate projection unit according to the embodiments may convert the positions of the points based on the coordinates indicating the positions of the points converted into and represented as cylindrical coordinates or spherical coordinates.

Figure 17:
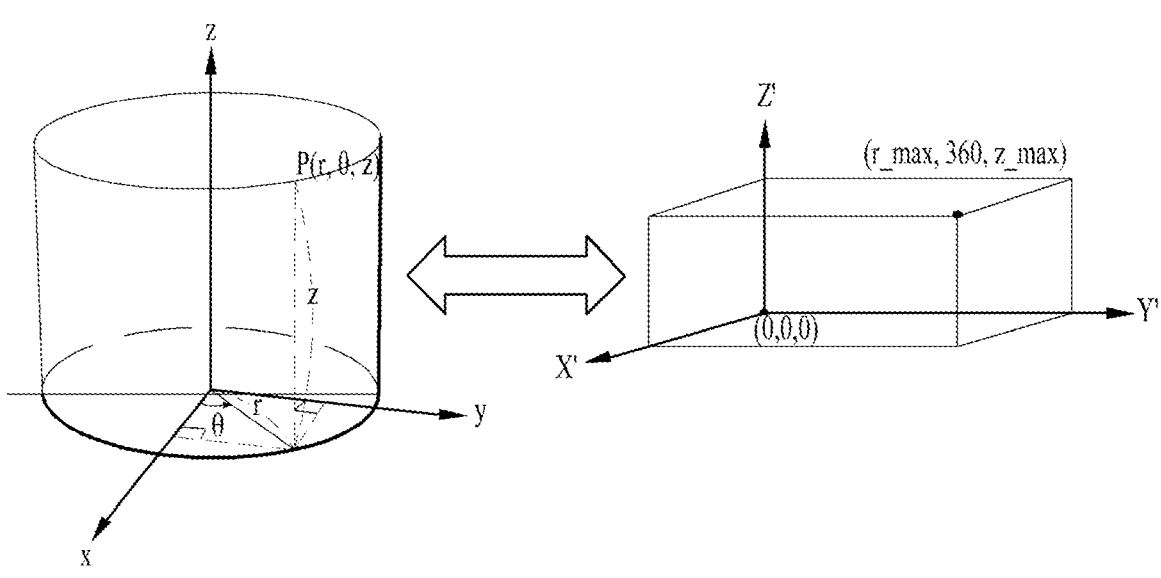
FIG. 17 illustrates an exemplary operation of coordinate projection of point cloud data according to embodiments.

FIG. 17 illustrates an exemplary operation of coordinate projection of point cloud data according to embodiments.

This figure illustrates an exemplary operation of converting point cloud data by the point cloud data transmission device (e.g., the point cloud video encoder 10002 of FIG. 1, the transmission device 1500 of FIG. 15, the projector 1507 of FIG. 15, or the coordinate projection unit 1507b of FIG. 15) according to the embodiments.

When the coordinates indicating the positions of the points presented in the Cartesian coordinate system are converted into cylindrical coordinates, the transmission device (e.g., the coordinate projection unit 1507b) according to the embodiments may convert the positions of the points based on the converted coordinates presented in the cylindrical coordinate system. For example, the transmission device may convert the positions of the points by multiplying each of the values of r, $\theta$, and z of the coordinates presented in the cylindrical coordinate system by a scale value (e.g., $\alpha$, $\beta$, and $\gamma$) for each axis of the Cartesian coordinate system. The scale value for each axis according to the embodiments may be a preset value, a value input by a user, or a value calculated by the transmission device/reception device. The transmission device may present the coordinates indicating the converted positions of the points in a new coordinate system. For example, the transmission device may present the coordinates indicating the converted positions of the points with parameters of a new Cartesian coordinate system (e.g., coordinate values of the X' axis, the Y' axis, and the Z' axis). The new Cartesian coordinate system according to the embodiments may be referred to as a third coordinate system. The new Cartesian coordinate system may include an origin (0, 0, 0), a pole (r_max (e.g., the maximum value of r), 360° (e.g., a value corresponding to 2π [rad]), z_max (e.g., the maximum value of z)), the X' axis, the Y' axis, and the Z' axis. The X' axis, Y' axis, and Z' axis of the new Cartesian coordinate system may be orthogonal to each other at the origin (0, 0, 0). The operation of the transmission device of converting the positions of the points may be represented as follows.

$$X' = \alpha r = \alpha\sqrt{x^2 + y^2}; \; Y' = \beta\theta = \beta\tan^{-1}\left(\frac{y}{x}\right); \; Z' = \gamma z.$$

The point cloud data transmission device according to the embodiments may change the positions of points in consideration of characteristics (e.g., distribution of points) of the acquired point cloud data. The transmission device may change the positions of the points based on the scale values for the respective axes according to the characteristic of distribution of the points. When the scale value for each axis is greater than 1, the converted positions of the points may be distributed more sparsely than the positions of the points before the conversion. On the other hand, when the scale value for each axis is less than 1, the converted positions of the points may be more densely distributed than the positions of the points before the conversion. For example, when the points of the acquired point cloud data are densely distributed along the x-axis and y-axis and sparsely distributed along the z-axis, the transmission device may uniformly convert the distribution of the positions of the points based on α and β greater than 1, and γ less than 1.

The point cloud data transmission device according to the embodiments may perform coding based on the converted positions (or geometry) of the points. Accordingly, the point cloud data transmission device may secure a higher coding gain by increasing coding efficiency by using the converted geometry (e.g., the geometry having a uniform distribution).

Figure 18:
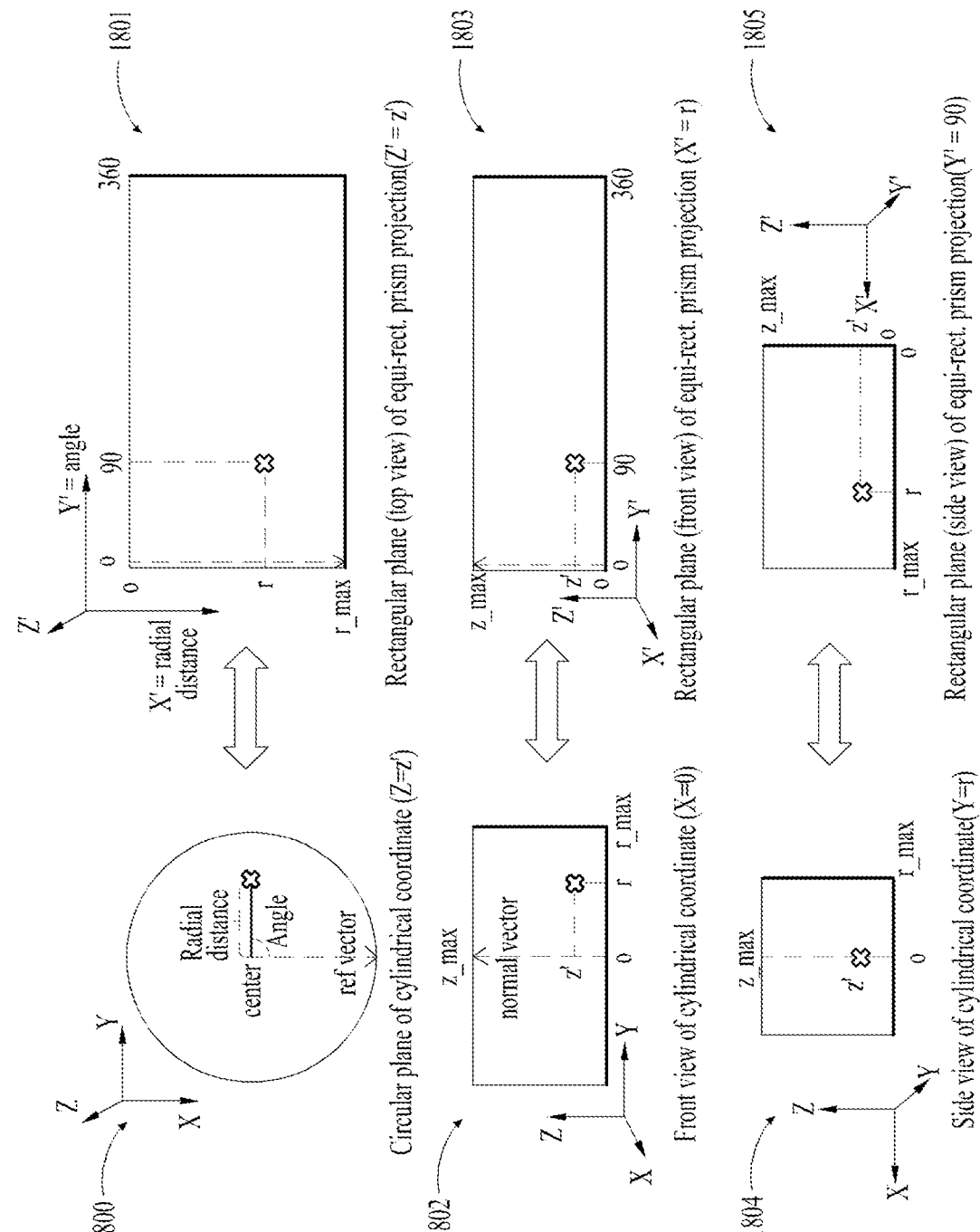

FIG. 18 illustrates an exemplary operation of coordinate projection of point cloud data according to embodiments.

This figure is an example of the operation of conversion of point cloud data described with reference to FIG. 17. The transmission device according to the embodiments may convert the position of a point based on the coordinates of the point presented in the cylindrical coordinate system by the conversion. For example, the transmission device may convert the position of a point by multiplying each of the values of r, θ, and z of the coordinates (e.g., r=r, θ=90°, z=z') of the point presented in the cylindrical coordinate system by the conversion by a scale value (e.g., α=1, β=1, and γ=1) for each axis.

The parts indicated by 1800 and 1801 are top views illustrating a process in which the transmission device (e.g., the coordinate projection unit 1507*b*) according to the embodiments converts the position of a point in the cylindrical coordinate system into a new Cartesian coordinate system (e.g., the new Cartesian coordinate system in FIG. 17). The part 1800 is a top view showing a point (r, 90°, z') in the cylindrical coordinate system. The point (r, 90°, z') may correspond to a vector that has a distance of r from the origin (0, 0, 0), and is rotated 90° from the x-axis (reference vector) in the xy-plane (reference plane). Thus, in the top view, the point (r, 90°, z') may be a point (0, r) in the xy-plane. The transmission device may convert the position of a point (r, 90°, z') in the cylindrical coordinate system by multiplying each of the values of r, θ, and z of the point by a scale value (e.g., α=1, β=1 and γ=1) for each axis. The converted position of the point may be represented in a new Cartesian coordinate system. Thus, the converted position of the point may be represented as (r, 90°, z') in the new Cartesian coordinate system. The part 1801 is a top view of the point converted into the new Cartesian coordinate system. The converted point may be a point separated from the origin (0, 0, 0) by r along the X'-axis, 90 along the Y'-axis, and z' along the Z'-axis. Thus, in the top view, the point corresponding to the converted point (r, 90, z') may be (r, 90) in the X'Y' plane.

The parts indicated by 1802 and 1803 are front views illustrating a process in which the transmission device (e.g., the coordinate projection unit 1507*b*) according to the embodiments converts the position of a point in the cylindrical coordinate system into a new Cartesian coordinate system (e.g., the new Cartesian coordinate system in FIG. 17). The part 1802 is a front view showing a point (r, 90°, z') in the cylindrical coordinate system. The point (r, 90°, z') may correspond to a vector that has a distance of r from the origin (0, 0, 0), and is rotated 90° from the x-axis (reference vector) in the xy-plane (reference plane). Thus, in the front view, the point (r, 90°, z') may be a point (r, z') in the yz-plane. The transmission device may convert the position of a point (r, 90°, z') in the cylindrical coordinate system by multiplying each of the values of r, θ, and z of the point by a scale value (e.g., α=1, β=1 and γ=1) for each axis. The converted position of the point may be represented in a new Cartesian coordinate system. Thus, the converted position of the point may be represented as (r, 90°, z') in the new Cartesian coordinate system. The part 1803 is a front view of the point converted into the new Cartesian coordinate system. The converted point may be a point separated from the origin (0, 0, 0) by r along the X'-axis, 90 along the Y'-axis, and z' along the Z'-axis. Thus, in the front view, the point corresponding to the converted point (r, 90, z') may be (90, z') in the Y'Z' plane.

The parts indicated by 1804 and 1805 are side views illustrating a process in which the transmission device (e.g., the coordinate projection unit 1507*b*) according to the embodiments converts the position of a point in the cylindrical coordinate system into a new Cartesian coordinate system (e.g., the new Cartesian coordinate system in FIG. 17). The part 1804 is a side view showing a point (r, 90°, z') in the cylindrical coordinate system. The point (r, 90°, z') may correspond to a vector that has a distance of r from the origin (0, 0, 0), and is rotated 90° from the x-axis (reference vector) in the xy-plane (reference plane). Thus, in the side view, the point (r, 90°, z') may be a point (0, z') in the xz plane. The transmission device may convert the position of a point (r, 90°, z') in the cylindrical coordinate system by multiplying each of the values of r, θ, and z of the point by a scale value (e.g., α=1, β=1 and γ=1) for each axis. The converted position of the point may be represented in a new Cartesian coordinate system. Thus, the converted position of the point may be represented as (r, 90°, z') in the new Cartesian coordinate system. The part 1805 is a side view of the point converted into the new Cartesian coordinate system. The converted point may be a point separated from the origin (0, 0, 0) by r along the X'-axis, 90 along the Y'-axis, and z' along the Z'-axis. Thus, in the side view, the point corresponding to the converted point (r, 90, z') may be (r, z') in the X'Z' plane.

As described above, the transmission device (e.g., the coordinate projection unit 1507*b*) according to the embodiments may convert the positions of points into a new Cartesian coordinate system using a scale value for each axis. In addition, the transmission device may convert the points so as to be uniformly distributed in the new Cartesian coordinate system. Accordingly, the transmission device may increase efficiency of coding (the geometry and/or attribute coding described with reference to FIGS. 1 to 17) based on a new geometry having a uniform distribution.

Figure 19:
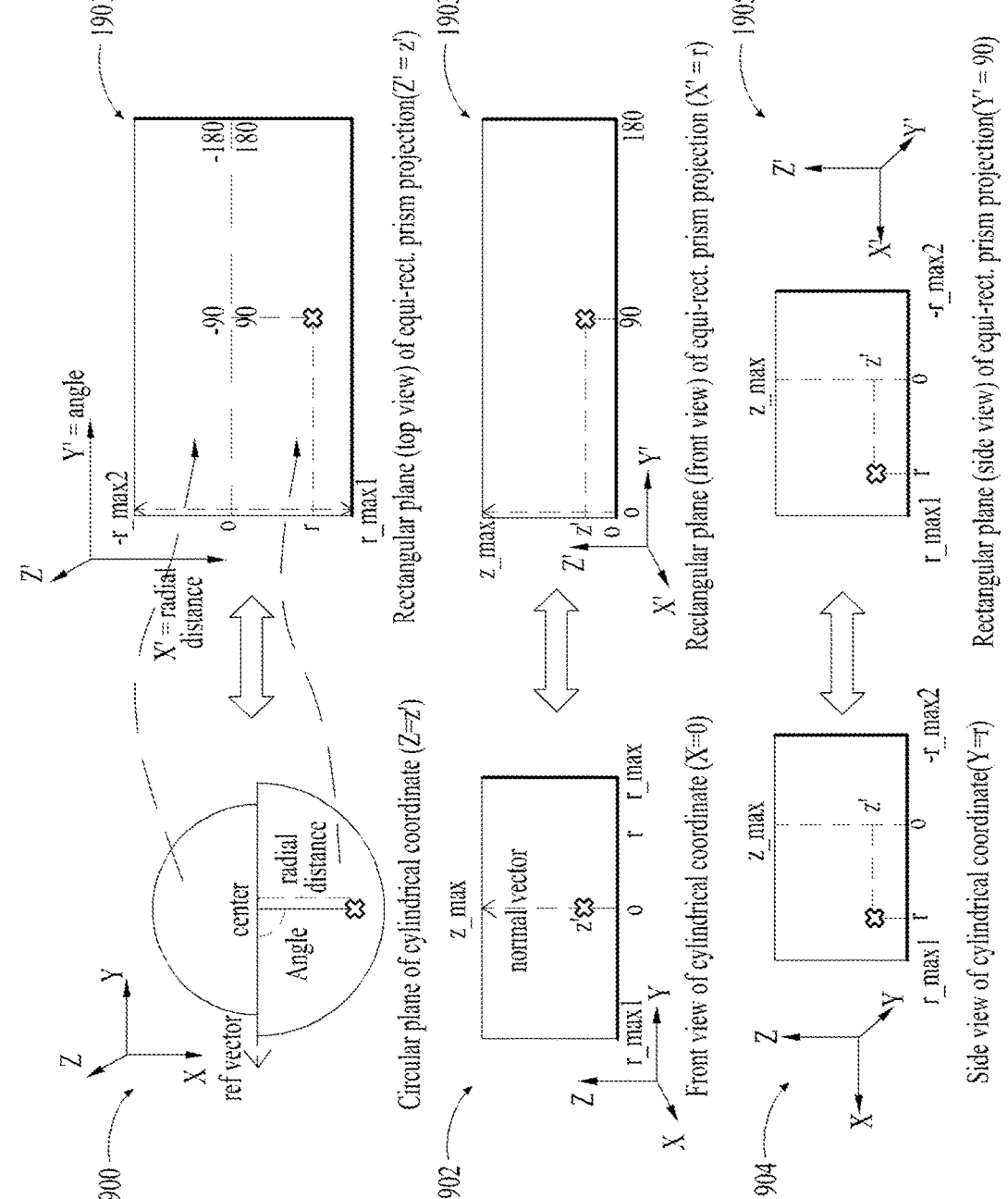
FIG. 19 illustrates an exemplary operation of coordinate projection of point cloud data according to embodiments.

FIG. 19 illustrates an exemplary operation of coordinate projection of point cloud data according to embodiments.

The distribution of point cloud data according to embodiments may vary depending on the surrounding environment of the point cloud data transmission device (e.g., the point cloud video acquirer 10001 of FIG. 1). For example, a light ray from the LiDAR (the LiDAR described with reference to FIGS. 1 to 18) may not reach far in a direction in which obstacles are present around the transmission device. Accordingly, as the distance from the LiDAR increases, points of LiDAR data (e.g., the LiDAR data of FIG. 16) may be sparsely distributed in the direction in which obstacles are present around the transmission device. That is, the points of the LiDAR data may have a smaller radius and be distributed asymmetrically in the direction in which obstacles are present. Therefore, when the conversion operation is performed by converting the coordinates indicating the positions of the points of the LiDAR data into the same second coordinate system, the characteristic of distribution of the points of the LiDAR data may not be accurately reflected.

Accordingly, the transmission device (e.g., the projector 1507 of FIG. 15) according to the embodiments may perform the conversion operation (e.g., the conversion operation described with reference to FIGS. 1 to 18) based on the second coordinate system (e.g., the second coordinate system of FIGS. 15 to 17) corresponding to a set of one or more coordinate systems, in consideration of the characteristic of distribution of the LiDAR data (or point cloud data). For example, the second coordinate system may be a set of cylindrical coordinate systems having different radii (or values of r).

This figure illustrates an exemplary operation of the transmission device (e.g., the coordinate projection unit 1507b of FIG. 15) according to embodiments of converting point cloud data based on the above-described second coordinate system. The above-described second coordinate system may be a set of different cylindrical coordinate systems. For example, the second coordinate system may be a set including a cylindrical coordinate system including the y-axis as a reference vector and r (greater than or equal to 0 and less than or equal to r_max1), θ (greater than or equal to 0 and less than or equal to 180°) and z as parameters, and a cylindrical coordinate system including the y-axis as a reference vector and r (greater than or equal to 0 and less than or equal to r_max2), θ (greater than or equal to 0 and less than or equal to)−180° and z as parameters. The transmission device according to the embodiments may convert the positions of points based on the converted coordinates of a point presented in the above-described second coordinate system. For example, the transmission device may convert the position of a point by multiplying each of the values of r, θ, and z of the coordinates (e.g., r=r, θ=90°, z=z') of the point presented in the above-described second coordinate system by the conversion by a scale value (e.g., α=1, β=1, and γ=1) for each axis.

The parts indicated by 1900 and 1901 are top views illustrating a process in which the transmission device (e.g., the coordinate projection unit 1507b) according to the embodiments converts the position of a point in the second coordinate system into a new Cartesian coordinate system (e.g., the new Cartesian coordinate system in FIG. 17). The part 1900 is a top view showing a point (r, 90°, z') in the second coordinate system. The point (r, 90°, z') may correspond to a vector that has a distance of r from the origin (0, 0, 0), and is rotated 90° from the y-axis (reference vector) in the xy-plane (reference plane). Thus, in the top view, the point (r, 90°, z') may be a point (r, 0) in the xy-plane. The transmission device may convert the position of a point (r, 90°, z') in the second coordinate system by multiplying each of the values of r, θ, and z of the point by a scale value (e.g., α=1, β=1 and γ=1) for each axis. The converted position of the point may be represented in a new Cartesian coordinate system. Thus, the converted position of the point may be represented as (r, 90°, z') in the new Cartesian coordinate system. The part 1901 is a top view of the point converted into the new Cartesian coordinate system. The converted point may be a point separated from the origin (0, 0, 0) by r along the X'-axis, 90 along the Y'-axis, and z' along the Z'-axis. Thus, in the top view, the point corresponding to the converted point (r, 90, z') may be (r, 90) in the X'Y' plane.

The parts indicated by 1902 and 1903 are front views illustrating a process in which the transmission device (e.g., the coordinate projection unit 1507b) according to the embodiments converts the position of a point in the second coordinate system into a new Cartesian coordinate system (e.g., the new Cartesian coordinate system in FIG. 17). The part 1902 is a front view showing a point (r, 90°, z') in the second coordinate system. The point (r, 90°, z') may correspond to a vector that has a distance of r from the origin (0, 0, 0), and is rotated 90° from the x-axis (reference vector) in the xy-plane (reference plane). Thus, in the front view, the point (r, 90°, z') may be a point (r, z') in the yz-plane. The transmission device may convert the position of a point (r, 90°, z') in the second coordinate system by multiplying each of the values of r, θ, and z of the point by a scale value (e.g., α=1, β=1 and γ=1) for each axis. The converted position of the point may be represented in a new Cartesian coordinate system. Thus, the converted position of the point may be represented as (r, 90°, z') in the new Cartesian coordinate system. The part 1903 is a front view of the point converted into the new Cartesian coordinate system. The converted point may be a point separated from the origin (0, 0, 0) by r along the X'-axis, 90 along the Y'-axis, and z' along the Z'-axis. Thus, in the front view, the point corresponding to the converted point (r, 90, z') may be (90, z') in the Y'Z' plane.

The parts indicated by 1904 and 1905 are side views illustrating a process in which the transmission device (e.g., the coordinate projection unit 1507b) according to the embodiments converts the position of a point in the cylindrical coordinate system into a new Cartesian coordinate system (e.g., the new Cartesian coordinate system in FIG. 17). The part 1904 is a side view showing a point (r, 90°, z') in the second coordinate system. The point (r, 90°, z') may correspond to a vector that has a distance of r from the origin (0, 0, 0), and is rotated 90° from the x-axis (reference vector) in the xy-plane (reference plane). Thus, in the side view, the point (r, 90°, z') may be a point (r, z') in the xz plane. The transmission device may convert the position of a point (r, 90°, z') in the second coordinate system by multiplying each of the values of r, θ, and z of the point by a scale value (e.g., α=1, β=1 and γ=1) for each axis. The converted position of the point may be represented in a new Cartesian coordinate system. Thus, the converted position of the point may be represented as (r, 90°, z') in the new Cartesian coordinate system. The part 1905 is a side view of the point converted into the new Cartesian coordinate system. The converted point may be a point separated from the origin (0, 0, 0) by r along the X'-axis, 90 along the Y'-axis, and z' along the Z'-axis. Thus, in the side view, the point corresponding to the converted point (r, 90, z') may be (r, z') in the X'Z' plane.

As described above, the transmission device (e.g., the coordinate projection unit 1507*b*) according to the embodiments may convert the positions of the points in consideration of the characteristic of distribution of the points of the point cloud data (or LiDAR data). That is, the transmission device may perform the conversion operation based on the second coordinate system obtained through conversion according to the characteristic of distribution of the point cloud data such that the points are uniformly distributed in the new Cartesian coordinate system.

Figure 20:
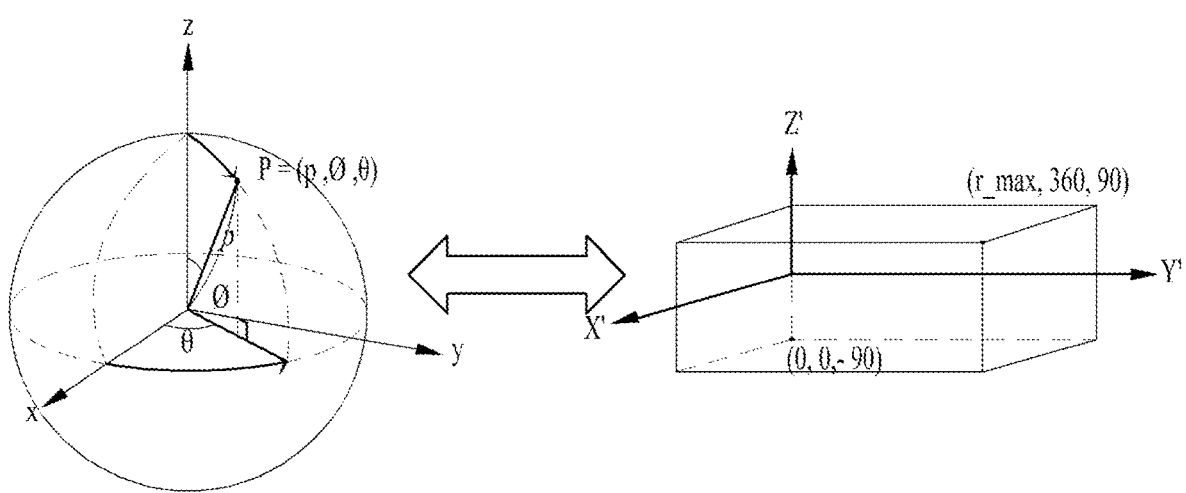
FIG. 20 illustrates an exemplary operation of coordinate projection of point cloud data according to embodiments.

FIG. 20 illustrates an exemplary operation of coordinate projection of point cloud data according to embodiments.

This figure illustrates an exemplary operation of converting point cloud data by the point cloud data transmission device (e.g., the point cloud video encoder 10002 of FIG. 1, the transmission device 1500 of FIG. 15, the projector 1507 of FIG. 15, or the coordinate projection unit 1507*b* of FIG. 15) according to the embodiments.

When the coordinates indicating the positions of the points presented in the Cartesian coordinate system are converted into spherical coordinates, the transmission device (e.g., the coordinate projection unit 1507*b*) according to the embodiments may convert the positions of the points based on the converted coordinates presented in the spherical coordinate system. For example, the transmission device may convert the positions of the points by multiplying each of the values of $\rho$, $\Phi$, and $\theta$ of the coordinates presented in the spherical coordinate system by a scale value (e.g., $\alpha$, $\beta$, and $\gamma$) for each axis of the Cartesian coordinate system. The scale value for each axis according to the embodiments may be a preset value, a value input by a user, or a value calculated by the transmission device. The transmission device may present the coordinates indicating the converted positions of the points in a new coordinate system. For example, the transmission device may present the coordinates indicating the converted positions of the points with parameters of a new Cartesian coordinate system (e.g., coordinate values of the X' axis, the Y' axis, and the Z' axis). The new Cartesian coordinate system may include an origin (0, 0, 0), a pole (r_max (e.g., the maximum value of p), 360°, 90), the X' axis, the Y' axis, and the Z' axis. The X' axis, Y' axis, and Z' axis of the new Cartesian coordinate system may be orthogonal to each other at the origin (0, 0, 0). The operation of the transmission device of converting the positions of the points may be represented as follows.

$$X' = \alpha\rho = \alpha\sqrt{x^2 + y^2 + z^2}\,;\ Y' = \beta\Phi = \beta\tan^{-1}\!\left(\frac{y}{x}\right);$$

$$Z' = \gamma\theta = \gamma\cos^{-1}\!\left(\frac{y}{\sqrt{x^2 + y^2 + z^2}}\right).$$

The point cloud data transmission device according to the embodiments may change the positions of points in consideration of characteristics (e.g., distribution of points) of the acquired point cloud data. The transmission device may change the positions of the points based on the scale values for the respective axes according to the characteristic of distribution of the points. When the scale value for each axis is greater than 1, the converted positions of the points may be distributed more sparsely than the positions of the points before the conversion. On the other hand, when the scale value for each axis is less than 1, the converted positions of the points may be more densely distributed than the positions of the points before the conversion. For example, when the points of the acquired point cloud data are densely distributed along the x-axis and y-axis and sparsely distributed along the z-axis, the transmission device may uniformly convert the distribution of the positions of the points based on $\alpha$ and $\beta$ greater than 1, and $\gamma$ less than 1.

The point cloud data transmission device according to the embodiments may perform coding based on the converted positions (or geometry) of the points. Accordingly, the point cloud data transmission device may secure a higher coding gain by increasing coding efficiency by using the converted geometry (e.g., the geometry having a uniform distribution).

FIG. 21 illustrates an exemplary operation of coordinate projection of point cloud data according to embodiments.

This figure illustrates an exemplary operation of converting point cloud data by the transmission device described with reference to FIG. 20 (e.g., the coordinate projection unit 1507*b* of FIG. 15). The transmission device may convert the position of a point based on the coordinates of the point converted into the spherical coordinate system. For example, the transmission device may convert the position of a point by multiplying each of the values of $\rho$, $\Phi$, and $\theta$ of the coordinates (e.g., $\rho$=r, $\Phi$=$\Phi$, $\theta$=$\theta$) of the point presented in the spherical coordinate system by the conversion by a scale value (e.g., $\alpha$=1, $\beta$=1, and $\gamma$=1) for each axis.

The parts indicated by 2100 and 2101 are top views illustrating a process in which the transmission device (e.g., the coordinate projection unit 1507*b*) according to the embodiments converts the position of a point in the spherical coordinate system into a new Cartesian coordinate system (e.g., the new Cartesian coordinate system in FIG. 17). The part 2100 is a top view showing a point (r, 1, 0) in the spherical coordinate system. The point (r, 1, 0) may correspond to a vector that has a distance of r from the origin (0, 0, 0), and is rotated from the x-axis (reference vector) by $\theta$ in the xy-plane (reference plane) and vertically rotated by 1 from the xy-plane. Thus, in the top view, the point (r, 1, 0) may be a point (r cos $\Phi$ cos $\theta$, r cos $\Phi$) in the xy-plane. The transmission device may convert the position of a point (r, 1, 0) in the spherical coordinate system by multiplying each of the values of $\rho$, $\Phi$, and $\theta$ of the point by a scale value (e.g., $\alpha$=1, $\beta$=1 and $\gamma$=1) for each axis. The converted position of the point may be represented in a new Cartesian coordinate system. Thus, the converted position of the point may be represented as (r, $\theta$, $\Phi$) in the new Cartesian coordinate system. The part 2101 is a top view of the point converted into the new Cartesian coordinate system. The converted point may be a point separated from the origin (0, 0, 0) by r along the X'-axis, $\theta$ along Y'-axis, and $\Phi$ along the Z'-axis. Thus, in the top view, the point corresponding to the converted point (r, $\theta$, $\Phi$) may be (r cos $\Phi$, $\theta$) in the X'Y' plane.

The parts indicated by 2102 and 2103 are front views illustrating a process in which the transmission device (e.g., the coordinate projection unit 1507*b*) according to the embodiments converts the position of a point in the spherical coordinate system into a new Cartesian coordinate system (e.g., the new Cartesian coordinate system in FIG. 17). The part 2102 is a front view showing a point (r, $\Phi$, $\theta$) in the spherical coordinate system. The point (r, $\Phi$, $\theta$) may *correspond* to a vector that has a distance of r from the origin (0, 0, 0), and is rotated from the x-axis (reference vector) by $\theta$ in the xy-plane (reference plane) and vertically rotated by $\Phi$ from the xy-plane. Thus, in the front view, the point (r, $\Phi$, $\theta$) may be a point (r cos $\Phi$ sin $\theta$, r sin $\Phi$) in the yz-plane. The transmission device may convert the position of a point (r, $\Phi$, $\theta$) in the spherical coordinate system by multiplying each of the values of $\rho$, $\Phi$, and $\theta$ of the point by a scale value (e.g., $\alpha$=1, $\beta$=1 and $\gamma$=1) for each axis. The converted position of the point may be represented in a new Cartesian coordinate system. Thus, the converted position of the point may be represented as (r, θ, Φ) in the new Cartesian coordinate system. The part 2103 is a front view of the point converted into the new Cartesian coordinate system. The converted point may be a point separated from the origin (0, 0, 0) by r along the X'-axis, θ along Y'-axis, and Φ along the Z'-axis. Thus, in the front view, the point corresponding to the converted point (r, θ, Φ) may be (θ, r sin Φ) in the Y'Z' plane.

The parts indicated by 2104 and 2105 are side views illustrating a process in which the transmission device (e.g., the coordinate projection unit 1507*b*) according to the embodiments converts the position of a point in the spherical coordinate system into a new Cartesian coordinate system (e.g., the new Cartesian coordinate system in FIG. 17). The part 2104 is a side view showing a point (r, Φ, θ) in the spherical coordinate system. The point (r, Φ, θ) may correspond to a vector that has a distance of r from the origin (0, 0, 0), and is rotated from the x-axis (reference vector) by θ in the xy-plane (reference plane) and vertically rotated by Φ from the xy-plane. Thus, in the side view, the point (r, Φ, θ) may be a point (r cos Φ cos θ, r sin Φ) in the xz plane. The transmission device may convert the position of a point (r, Φ, θ) in the spherical coordinate system by multiplying each of the values of ρ, Φ, and θ of the point by a scale value (e.g., $\alpha=1$, $\beta=1$ and $\gamma=1$) for each axis. The converted position of the point may be represented in a new Cartesian coordinate system. Thus, the converted position of the point may be represented as (r, θ, Φ) in the new Cartesian coordinate system. The part 2105 is a side view of the point converted into the new Cartesian coordinate system. The converted point may be a point separated from the origin (0, 0, 0) by r along the X'-axis, θ along Y'-axis, and Φ along the Z'-axis. Thus, in the side view, the point corresponding to the converted point (r, θ, Φ) may be (r cos Φ, r sin Φ) in the X'Z' plane.

As described above, the transmission device (e.g., the coordinate projection unit 1507*b*) according to the embodiments may convert the positions of point cloud data into a new Cartesian coordinate system using a scale value for each axis. In addition, the transmission device may convert the points so as to be uniformly distributed in the new Cartesian coordinate system. Accordingly, the transmission device may increase efficiency of coding (the geometry and/or attribute coding described with reference to FIGS. 1 to 17) based on a new geometry having a uniform distribution.

Figure 22:
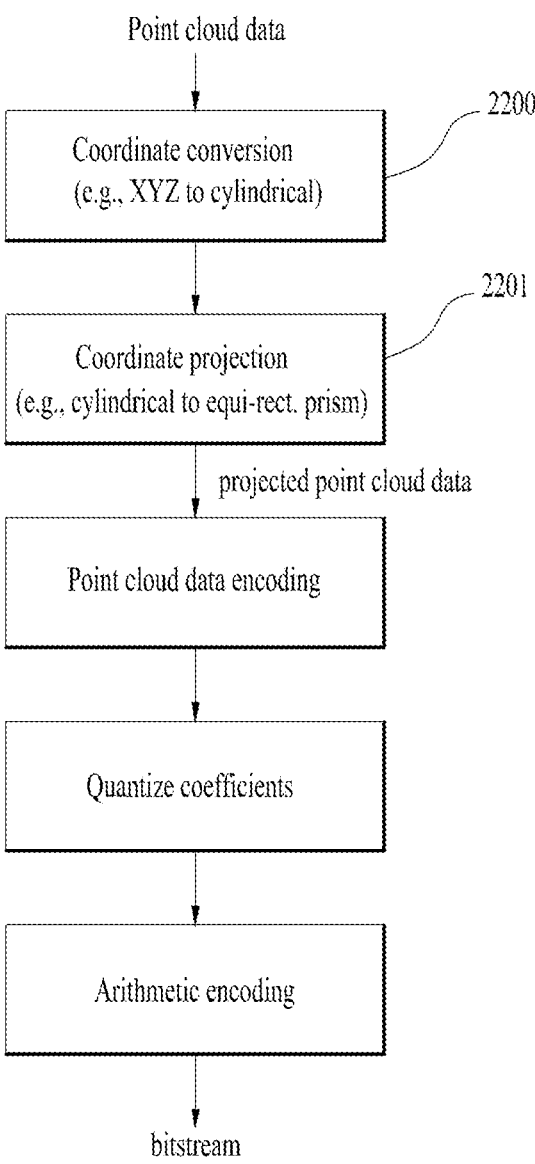
FIG. 22 is a flowchart including an operation of conversion of point cloud data according to embodiments.

FIG. 22 is a flowchart including an operation of conversion of point cloud data according to embodiments.

This figure is an exemplary flowchart related to conversion of point cloud data by the transmission device (e.g., the point cloud video encoder 10002 of FIG. 1, the point cloud encoder of FIG. 4, and the point cloud encoder described with reference to FIG. 12) according to the embodiments (e.g., the conversion operation described with reference to FIGS. 15 to 21).

The transmission device (e.g., the point cloud video acquirer 10001 of FIG. 1) according to embodiments may receive point cloud data (e.g., the point cloud data described with reference to FIGS. 1 to 15) as input. The geometry (or geometry data) of the point cloud data may be presented in a first coordinate system (e.g., the Cartesian coordinate system). The first coordinate system is the same as that described with reference to FIG. 15. The transmission device may perform an operation of encoding the point cloud data (e.g., the encoding described with reference to FIGS. 1 to 21).

The transmission device according to the embodiments (e.g., the coordinate conversion unit 1507*a* of FIG. 15) may convert the coordinates indicating the positions of the points presented in the first coordinate system (e.g., the Cartesian coordinate system) to a second coordinate system (e.g., spherical coordinates or cylindrical coordinates (2200). The second coordinate system is the same as that described above with reference to FIGS. 15 to 21. Details of the operation of the transmission device according to the embodiments of converting the coordinates indicating the positions of the points presented in the first coordinate system into the second coordinate system have been described agove with reference to FIGS. 15 and 16.

The transmission device (e.g., the coordinate projection unit 1507*b* of FIG. 15) according to the embodiments may convert the positions of the points based on the coordinates indicating the converted positions of the points presented in the second coordinate system (e.g., spherical coordinates or cylindrical coordinates). Details of the operation of the transmission device according to the embodiments of converting the positions of points based on the coordinates indicating the converted positions of the points presented in the second coordinate system have been described with reference to FIGS. 15 and 17 to 21. The transmission device may generate converted geometry through the above-described conversion operation.

The transmission device (e.g., the point cloud video encoder 10002 of FIG. 1, the point cloud encoder of FIG. 4, and the point cloud encoder described with reference to FIG. 12) may perform point cloud data encode (e.g., the geometry and/or attribute encoding described with reference to FIGS. 1 to 15) based on the converted geometry.

The transmission device (e.g., the coefficient quantizer 40011 or the transform/quantization unit 1505) according to the embodiments may quantize the encoded point cloud data. The operation of quantizing the point cloud data by the transmission device according to the embodiments is the same as or similar to the quantization described with reference to FIGS. 1 to 15.

The transmission device (e.g., the arithmetic coder 12006, etc.) according to the embodiments may entropy-encode an octree and/or an approximated octree of the point cloud data. The operation of entropy-encoding the octree and/or approximated octree of the point cloud data is the same as or similar to the entropy encoding described with reference to FIGS. 1 to 15.

The geometry converted by the transmission device according to the embodiments may be used only for geometry encoding (not shown in this figure), only for attribute encoding (not shown in this figure), or for both geometry encoding and attribute encoding. Details of the operation of using the converted geometry for geometry encoding or attribute encoding is the same as those described above with reference to FIG. 15.

The transmission device (e.g., the transmission processor 12012 or the multiplexer 1508) according to the embodiments may transmit a point cloud data bitstream. The operation of transmitting the bitstream by the transmission device according to the embodiments is the same as or similar to the transmission operation described with reference to FIGS. 1 to 15.

Figure 23:
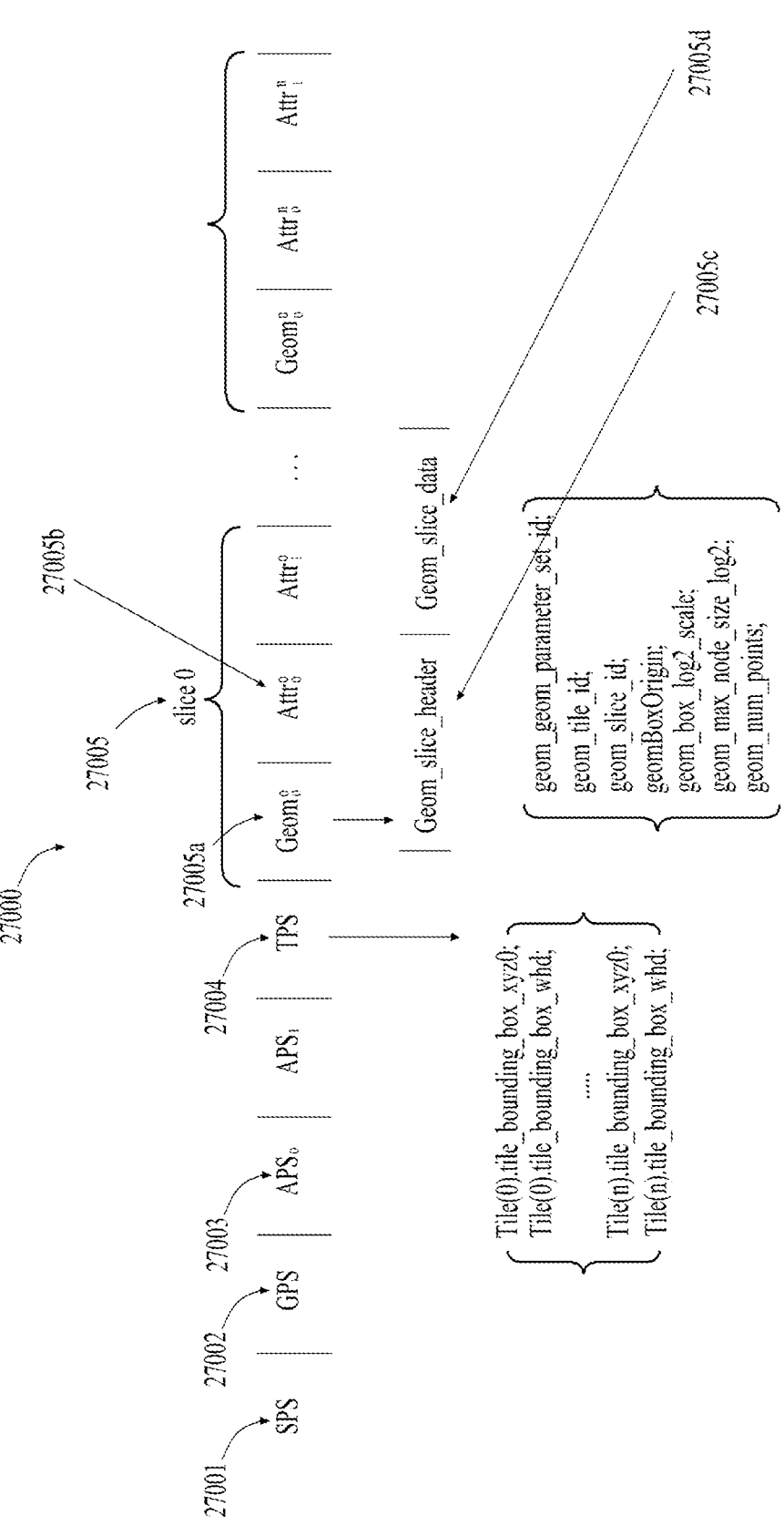
FIG. 23 shows a structure of a bitstream according to embodiments.

FIG. 23 shows a structure of a bitstream according to embodiments.

As described above, the point cloud data transmission device (e.g., the point cloud data transmission device described with reference to FIGS. 1, 11, 14 and 15) may transmit the encoded point cloud data in the form of a bitstream 27000. The bitstream 27000 may include one or more sub-bitstreams.

The point cloud data reception device (e.g., the point cloud data reception device described with reference to FIGS. 1, 2, 13 and 24) according to the embodiments receives the bitstream from the point cloud data transmission device. The point cloud data reception device may parse and decode the received bitstream.

The point cloud data transmission device (e.g., the point cloud data transmission device described in FIGS. 1, 11, 14 and 15) may divide an image of the point cloud data into one or more packets in consideration of the error of the transmission channel, and transmit the same over the network. According to embodiments, the bitstream 27000 may include one or more packets (e.g., network abstraction layer (NAL) units). Therefore, even when some packets are lost in a poor network environment, the point cloud data reception device may reconstruct the image using the remaining packets. The point cloud data may be partitioned into one or more slices or one or more tiles to be processed. The tiles and slices according to embodiments are regions for performing point cloud compression coding by partitioning a picture of the point cloud data. The point cloud data transmission device may provide high-quality point cloud content by processing data corresponding to each region according to the importance of each partitioned region of the point cloud data. That is, the point cloud data transmission device may perform point cloud compression coding having better compression efficiency and appropriate latency on data corresponding to a region important to a user.

A tile according to the embodiments represents a cuboid in a three-dimensional space (e.g., a bounding box) in which point cloud data is distributed. A slice according to the embodiments is a series of syntax elements representing some or all of encoded point cloud data, and represents a set of points that may be independently encoded or decoded. According to embodiments, a slice may include data transmitted through a packet, and may include one geometry data unit and zero or more attribute data units. According to embodiments, a tile may include one or more slices.

The point cloud data transmission device according to the embodiments may transmit a bitstream 27000 having a bitstream structure as shown in this figure. The bitstream 27000 of the point cloud data may include a sequential parameter set (SPS) 27001, a geometry parameter set (GPS) 27002, an attribute parameter set (APS) 27003, a tile parameter set (TPS) 27004, and one or more may include slices 27005. The bitstream 27000 of the point cloud data may include one or more tiles. A tile according to the embodiments may be a group of slices including one or more slices.

The SPS 27001 is a syntax structure containing syntax elements that apply to zero or more entire CVSs as determined by the content of a syntax element found in the PPS referred to by a syntax element found in each slice segment header. The SPS may include sequence information about the point cloud data bitstream according to the embodiments.

The GPS 27002 may be a syntax structure including syntax elements that apply to zero or more entire geometry (or encoded geometry). The GPS 27002 may include information about a method of encoding attribute information of the point cloud data included in the one or more slices 27005. The GPS 27002 may include SPS identifier information indicating the SPS 27001 to which the included geometry parameter is related, and GPS identifier information for identifying the GPS.

The APS 27003 may be a syntax structure including syntax elements that apply to zero or more entire attributes (or encoded attributes). The APS 27003 may include information about a method of encoding attribute information of the point cloud data included in the one or more slices 27005. The APS 27003 may include SPS identifier information indicating the SPS 27001 to which the included geometry parameter is related, and APS identifier information for identifying the APS.

The TPS 27004 may be a syntax structure including syntax elements that apply to zero or more entire tiles (or encoded tiles). A tile inventory includes information about zero or more tiles included in the point cloud data bitstream. According to embodiments, the tile inventory may be referred to as a tile parameter set (TPS).

The TPS 27004 may include identifier information for identifying one or more tiles and information indicating a range of the one or more tiles (i.e., a bounding box of the tile). The information indicating the range of the one or more tiles (i.e., the bounding box of the tile) may include coordinate information about a point that is a reference of a bounding box represented by a corresponding tile (e.g., Tile(n).tile_bounding_box_xyz0) and information about the width, height, and depth of the bounding box (e.g., Tile(n). tile_bounding_box_whd). The TPS 27004 may be referred to as a tile inventory.

When a plurality of tiles is present, the tile parameter set 27004 may include information indicating a bounding box for each of the tiles. For example, when each tile is indicated as 0 to n by the identifier information for the tiles, the information indicating the bounding box of each tile may be represented as Tile(0).tile_bounding_box_xyz0, Tile(0). tile_ bounding_box_whd, Tile(1).tile_bounding_box_xyz0, Tile(1).tile_bounding_box_whd, and so on.

The slice 27005 may be a unit of encoding of the point cloud data by the point cloud data transmission device. The slice 27005 may be a unit including one geometry bitstream Geom00 and one or more attribute bitstreams Attr00 and Attr10.

The slice 27005 may include a geometry slice (Geom) 27005*a* representing geometry information about the point cloud data included in the slice, and one or more attribute slices (Attr) 27005*b* representing attribute information about the point cloud data included in the slice.

The geometry slice (Geom) 27005*a* includes geometry slice data (Geom_slice_data) 27005*d* including geometry information about the point cloud data, and a geometry slice header (GSH) (Geom_slice_header) 27005*c* including information about the geometry slice data.

The GSH 27005*c* contains information about the geometry slice data 27005*d* in the slice. For example, the GSH 27005*c* may contain a geometry parameter set identifier (geom_geom_parameter_set_id) for identifying the GPS 27002 representing the geometry information about the slice, and a geometry slice identifier (geom_slice_id) for identifying the geometry slice, geometry box origin information (geomBoxOrigin) indicating the origin of the box of the geometry slice data, information (geom_box_log 2_scale) indicating a logarithmic scale of the geometry slice, and information (geom_num_points) related to the number of points in the geometry slice.

When the point cloud data bitstream according to the embodiments contains one or more tiles, the header of the geometry bitstream may further contain information (geom_tile_id) for identifying a tile including the geometry bitstream.

The attribute slice (Attr) 27005a includes attribute slice data (Attr_slice_data) containing attribute information about the point cloud data and an attribute slice header (ASH) (Attr_slice_header) 27005c containing information about the attribute slice data.

According to embodiments, parameters required to encode a point cloud may be newly defined as a parameter set and header information for the point cloud. For example, the parameters may be added to the attribute parameter set RBSP syntax in encoding attribute information, and be added to the tile_header syntax in performing tile-based encoding.

According to embodiments, the above-described parameters may be signaled on a tile-by-tile basis or a slice-by-slice basis. The above-described parameters may be signaled in the SPS, the GPS, the APS, or the tile inventory.

When the point cloud data according to the embodiments is transmitted on a slice-by-slice basis, the parameters shown in this figure according to the embodiments may be included in the APS including information on attribute information about each slice.

When the point cloud data according to the embodiments is transmitted on a slice-by-slice basis, the parameters shown in this figure according to the embodiments may be included in a geometry slice header (gsh).

When the point cloud data according to the embodiments is transmitted on a tile-by-tile basis, the parameters shown in FIG. 17 according to the embodiments may be included in the TPS including information on attribute information about each slice (or tile inventory).

The PCC transmission/reception method according to the embodiments may provide parameters for point cloud data for each unit such as a tile, geometry, an attribute, and/or a slice by providing the bitstream structure as described above. Accordingly, the PCC transmission/reception method according to the embodiments may provide point cloud compression coding having better compression efficiency and appropriate latency by signaling information required for coding of point cloud data according to each unit.

As the PCC transmission/reception method according to the embodiments provides the bitstream structure as described above, the decoding performance of the receiver may be enhanced for the attribute information about the point cloud data. In addition, more robust quantization may be implemented by signaling the SA-DCT transform, and accordingly a perceptual improvement in inverse transform performance may be provided at the output terminal of the decoder.

FIG. 24 shows an example of signaling information related to an operation of conversion of point cloud data according to embodiments.

A point cloud data bitstream according to embodiments may include signaling information (or a flag) related to the conversion operation shown in this figure. The signaling information (or flag) related to the conversion operation in this figure may be included in the bitstream described with reference to FIG. 23. The point cloud data reception device according to the embodiments may perform the operation of converting the point cloud data based on the signaling information (or flag) in this figure.

projection_info_id may be an indicator for identifying signaling information related to the conversion operation according to the embodiments.

projection_type may indicate the type of the second coordinate system (e.g., the second coordinate system of FIGS. 15 to 22) used in the conversion operation according to the embodiments. For example, projection_type equal to 0 indicates that the second coordinate system is the cylindrical coordinate system. projection_type equal to 1 indicates that the second coordinate system is a set of one or more coordinate systems. projection_type equal to 2 indicates that the second coordinate system is the spherical coordinate system.

geo_projection_enable_flag may indicate that the converted geometry (or geometry data) according to embodiments is used for geometry coding (e.g., the geometry coding of FIGS. 1 to 15). For example, when geo_projection_enable_flag is 1, the converted geometry is used for geometry coding. When geo_projection_enable_flag is 0, the converted geometry is not used for geometry coding.

attr_projection_enable_flag may indicate that the converted geometry (or geometry data) according to embodiments is used for attribute coding (e.g., the attribute coding of FIGS. 1 to 15). For example, when attr_projection_enable_flag is 1, the converted geometry is used for attribute coding. When attr_projection_enable_flag is 0, the converted geometry is not used for attribute coding.

bounding_box_x_offset may indicate an x-axis starting point of a bounding box including points of point cloud data converted into the second coordinate system according to the embodiments.

bounding_box_y_offset may indicate a y-axis starting point of the bounding box including the points of the point cloud data converted into the second coordinate system according to the embodiments.

bounding_box_z_offset may indicate a z-axis starting point of the bounding box including the points of the point cloud data converted into the second coordinate system according to the embodiments.

orig_bounding_box_x_offset may indicate an x-axis starting point of a bounding box including points of point cloud data presented in the first coordinate system according to the embodiments.

orig_bounding_box_y_offset may indicate a y-axis starting point of the bounding box including the points of the point cloud data presented in the first coordinate system according to the embodiments.

orig_bounding_box_z_offset may indicate a z-axis starting point of the bounding box including the points of the point cloud data presented in the first coordinate system according to the embodiments.

orig_bounding_box_x length may indicate an x-axis length of a bounding box including points of point cloud data presented in the first coordinate system according to the embodiments.

orig_bounding_box_y length may indicate a y-axis length of the bounding box including the points of the point cloud data presented in the first coordinate system according to the embodiments.

orig_bounding_box_z length may indicate a z-axis length of the bounding box including the points of the point cloud data presented in the first coordinate system according to the embodiments.

rotation_yaw is information about rotation about the z-axis of the LiDAR (e.g., the LiDAR of FIG. 16) according to the embodiments.

rotation_pitch is information about rotation about the lateral axis of the LiDAR (e.g., the LiDAR of FIG. 16) according to the embodiments.

rotation_roll is information about the rotation about the longitudinal axis of the LiDAR (e.g., the LiDAR of FIG. 16) according to the embodiments.

When projection_type described above is 0, the second coordinate system according to the embodiments may represent the cylindrical coordinate system. When projection_type is 0, signaling information related to the conversion operation according to the embodiments further includes the following fields.

cylinder_center_x indicates an x-axis value of the center in the cylindrical coordinate system according to the embodiments.

cylinder_center_y indicates a y-axis value of the center in the cylindrical coordinate system according to the embodiments.

cylinder_center_z indicates a z-axis value of the center in the cylindrical coordinate system according to the embodiments.

cylinder_radius_max indicates the maximum value of r in the cylindrical coordinate system according to the embodiments.

cylinder_degree_max indicates the maximum value of 0 in the cylindrical coordinate system according to the embodiments.

cylinder_z_max indicates the maximum value of z in the cylindrical coordinate system according to the embodiments.

ref_vector_x indicates an x value of coordinates indicating the direction of a reference vector of the cylindrical coordinate system according the to embodiments.

ref_vector_y indicates a y value of the coordinates indicating the direction of the reference vector of the cylindrical coordinate system according the to embodiments.

ref_vector_z indicates a z value of the coordinates indicating the direction of the reference vector of the cylindrical coordinate system according the to embodiments.

clockwise_degree_flag indicates a direction in which 0 is obtained in the cylindrical coordinate system according to the embodiments. For example, clockwise_degree_flag equal to 1 indicates the clockwise direction in the top view. clockwise_degree_flag equal to 0 indicates a counterclockwise direction in the top view.

granularity_radius may indicate a resolution with respect to a distance from the center in the cylindrical coordinate system according to the embodiments. granularity_radius may correspond to a scale value (e.g., (3) for each axis according to embodiments.

granularity_angular may indicate a resolution with respect to θ in the cylindrical coordinate system according to the embodiments. granularity_angular may correspond to a scale value (e.g., α) for each axis according to embodiments.

granularity_normal may indicate a resolution with respect to a distance from the center in the direction of the normal vector in the cylindrical coordinate system according to the embodiments. granularity_normal may correspond to a scale value (e.g., γ) for each axis according to embodiments.

When projection_type described above is 1, the second coordinate system according to the embodiments may represent a set of one or more coordinate systems (e.g., a set of two different cylindrical coordinate systems). When projection_type is 1, signaling information related to the conversion operation according to the embodiments further includes the following fields. The fields below are an example in the where the second coordinate system is a set of two different cylindrical coordinate systems (e.g., a first cylindrical coordinate system and a second cylindrical coordinate system).

cylinder_center_x indicates an x-axis value of the center in the set of different cylindrical coordinate systems according to the embodiments.

cylinder_center_y indicates a y-axis value of the center in the set of different cylindrical coordinate systems according to the embodiments.

cylinder_center_z indicates a z-axis value of the center in the set of different cylindrical coordinate systems according to the embodiments.

cylinder_radius_max1 indicates the maximum value of r in the first cylindrical coordinate system according to the embodiments.

cylinder_radius_max2 indicates the maximum value of r in the second cylindrical coordinate system according to the embodiments.

cylinder_degree_max1 indicates the maximum value of 0 in the first cylindrical coordinate system according to the embodiments.

cylinder_degree_max2 indicates the maximum value of 0 in the second cylindrical coordinate system according to the embodiments.

cylinder_z_max indicates the maximum value of z in the set of different cylindrical coordinate systems according to the embodiments.

ref_vector__x indicates an x value of coordinates indicating the direction of a reference vector in the set of different cylindrical coordinate systems according to the embodiments.

ref_vector_y indicates a y value of the coordinates indicating the direction of the reference vector in the set of different cylindrical coordinate systems according to the embodiments.

ref_vector_z indicates a z value of the coordinates indicating the direction of the reference vector in the set of different cylindrical coordinate systems according to the embodiments.

normal_vector_x indicates an x value of coordinates indicating the direction of a normal vector in the set of different cylindrical coordinate systems according to the embodiments.

normal_vector_y indicates a y value of the coordinates indicating the direction of the normal vector in the set of different cylindrical coordinate systems according to the embodiments.

normal_vector_z indicates a z value of the coordinates indicating the direction of the normal vector in the set of different cylindrical coordinate systems according to the embodiments.

granularity_radius may indicate a resolution with respect to a distance from the center in the set of different cylindrical coordinate systems according to the embodiments. granularity_radius may correspond to a scale value (e.g., β) for each axis according to embodiments.

granularity_angular may indicate a resolution with respect to θ in the set of different cylindrical coordinate systems according to the embodiments. granularity_angular may correspond to a scale value (e.g., a) for each axis according to embodiments.

granularity_normal may indicate a resolution with respect to a distance from the center in the direction of the normal vector in the set of different cylindrical coordinate systems according to the embodiments. granularity_normal may correspond to a scale value (e.g., y) for each axis according to embodiments.

The point cloud data transmission device according to the embodiments may transmit a bitstream including the above-described type of signaling information, thereby increasing compression efficiency and image quality performance and reducing the burden on the reception device.

FIG. 25 shows a structure of a sequential parameter set (SPS) of point cloud data according to embodiments.

A bitstream of point cloud data according to embodiments may include a sequential parameter set (SPS) including signaling information (or flags) as shown in this figure. The SPS may refer to the SPS 27001 described with reference to FIG. 23. The point cloud data receiver according to the embodiments may decode the point cloud data based on the signaling information (or flag information) of this figure.

profile_idc indicates a profile to which the bitstream conforms as specified in Annex A. Bitstreams shall not contain values of profile_idc other than those specified in Annex A. Other values of profile_idc are reserved for future use by ISO/IEC.

profile_compatibility_flags equal to 1, indicates that the bitstream conforms to the profile indicated by profile_idc equal to j as specified in Annex A. The value of profile_compatibility_flag[j] shall be equal to 0 for any value of j that is not specified as an allowed value of profile_idc in Annex A.

level_idc indicates a level to which the bitstream conforms as specified in Annex A. Bitstreams may not contain values of level_idc other than those specified in Annex A. Other values of level_idc are reserved for future use by ISO/IEC.

sps_bounding_box_present_flag equal to 1 specifies the bounding box offset and size information is signalled. sps_bounding_box_present_flag equal to 0 specifies)

When the value of sps_bounding_box_present_flag is TRUE, the SPS according to the embodiments further includes sps_bounding_box_offset_x, sps_bounding_box_offset_y, sps_bounding_box_offset_z, sps_bounding_box_scale_factor, sps_bounding_box_size_width, sps_bounding_box_size_height, and sps_bounding_box_size_depth.

sps_bounding_box_offset_x indicates the x offset of the source bounding box in the Cartesian coordinates. When not present, the value of sps_bounding_box_offset_x is inferred to be 0.

sps_bounding_box_offset_y indicates the y offset of the source bounding box in the Cartesian coordinates. When not present, the value of sps_bounding_box_offset_y is inferred to be 0.

sps_bounding_box_offset_z indicates the z offset of the source bounding box in the Cartesian coordinates. When not present, the value of sps_bounding_box_offset_z is inferred to be 0.

sps_bounding_box_scale_factor indicates the scale factor the source bounding box in the Cartesian coordinates. When not present, the value of sps_bounding_box_scale_factor is inferred to be 1. Indicates. When not present, the value of sps_bounding_box_scale_factor is inferred to be 0.

sps_bounding_box_size_width indicates the width of the source bounding box in the Cartesian coordinates. When not present, the value of sps_bounding_box_size_width is inferred to be a specific value (such as 10).

sps_bounding_box_size_height indicates the height of the source bounding box in the Cartesian coordinates. When not present, the value of sps_bounding_box_size_height is inferred to be 1. When not present, the value of sps_bounding_box_size_height is inferred to be 0.

sps_bounding_box_size_depth indicates the depth of the source bounding box in the Cartesian coordinates. When not present, the value of sps_bounding_box_size_depth is inferred to be 1. When not present, the value of sps_bounding_box_size_depth is inferred to be 0.

sps_source_scale_factor indicates the scale factor of the source point cloud.

sps_seq_parameter_set_id provides an identifier for the SPS for reference by other syntax elements. In The value of sps_seq_parameter_set_id may be in the range of 0 to 15, inclusive in bitstreams conforming to this version of this Specification. The value other than 0 for sps_seq_parameter_set_id is reserved for future use by ISO/IEC.

sps_num_attribute_sets indicates the number of coded attributes in the bitstream. The value of sps_num_attribute_sets may be in the range of 0 to 64.

attribute_dimension[i] specifies the number of components of the i-th attribute. Index i may be greater than or equal to 0, and may be less than a value indicated by sps_num_attribute_sets.

attribute_instance_id[i] specifies attribute instance id.

attribute_bitdepth[i] specifies the bitdepth of the i-th attribute signal(s).

attribute_cicp_colour_primaries[i] indicates the chromaticity coordinates of the colour attribute source primaries.

attribute_cicp_transfer_characteristics[i] either indicates the reference opto-electronic transfer characteristic function of the colour attribute as a function of a source input linear optical intensity Lc with a nominal real-valued range of 0 to 1 or indicates the inverse of the reference electro-optical transfer characteristic function as a function of an output linear optical intensity Lo with a nominal real-valued range of 0 to 1.

attribute_cicp_matrix_coeffs[i] describes the matrix coefficients used in deriving luma and chroma signals from the green, blue, and red, or Y, Z, and X primaries.

attribute_cicp_video_full_range_flag[i] specifies that the black level and range of the luma and chroma signals as derived from E'Y, E'PB, and E'PR or E'R, E'G, and E'B real-valued component signals.

known_attribute_label_flag[i] equal to 1 specifies that know_attribute_label is signalled for the i-th attribute. known_attribute_label_flag[i] equal to 0 specifies that attribute_label_four_bytes is signalled for the i-th attribute.

known_attribute_label[i] equal to 0 specifies that the attribute is colour. known_attribute_label[i] equal to 1 specifies that the attribute is reflectance. known_attribute_label[i] equal to 2 specifies that the attribute is frame index.

The SPS according to the embodiments may further include signaling information related to the operation of conversion of the point cloud data described above with reference to FIG. 24.

projection_flag may indicate that the conversion operation has been performed by the transmission device according to the embodiments. Accordingly, in response to projection_flag indicating that the conversion operation has been performed by the transmission device, the SPS according to the embodiments may further include signaling information related to the conversion operation described above with reference to FIG. 24. Also, in response to projection_flag indicating that the conversion operation has been performed by the transmission device, the reception device according to the embodiments may perform an inverse conversion operation. For example, projection_flag equal to 1 indicates that the conversion operation has been performed by the transmission device. projection_flag equal to 0 indicates that the conversion operation has not been performed by the transmission device.

sps_extension_present_flag equal to 1 specifies that the sps_extension_data syntax structure is present in the SPS RBSP syntax structure. sps_extension_present_flag equal to 0 specifies that this syntax structure is not present. When not present, the value of sps_extension_present_flag is inferred to be equal to 0.

sps_extension_data flag may have any value. Its presence and value do not affect decoder conformance to profiles specified in Annex A Decoders conforming to a profile specified in Annex A.

The point cloud data transmission device according to the embodiments may transmit the bitstream in the form described above, thereby increasing compression efficiency, increasing image quality performance, and reducing the burden on the reception device.

FIG. 26 shows a structure of a tile inventory of point cloud data according to embodiments.

A bitstream of point cloud data according to embodiments may include a tile inventory (tile inventory) containing the signaling information (or flags) shown in this figure. The tile inventory shown in this figure may refer to the tile parameter set 27004 described with reference to FIG. 23. The point cloud data reception device according to the embodiments may decode the point cloud data based on the signaling information (or flag information) shown in this figure.

num_tiles represents the number of tiles signalled for the bitstream. When not present, num_tiles is inferred to be 0.

The tile inventory may include information about positions at which tiles present in the bitstream are located within a bounding box (e.g., tile_bounding_box_offset_x, tile_bounding_box_offset_y, tile_bounding_box_offset_z, etc.), scale factor information in the bounding box of tiles (e.g., tile_bounding_box_scale_factor, etc.), width or height information (e.g., tile_bounding_box_size_width, tile_bounding_box_size_height) about the bounding box of tiles.

The tile inventory may include parameters (e.g., tile_bounding_box_offset_x, tile_bounding_box_offset_y, tile_bounding_box_offset_z, tile_bounding_box_scale_factor, tile_bounding_box_size_width, and tile_bounding_box_size_height) included in the for statement in this figure as many as the number of tiles. In this figure, i may represent an index for each tile. tile_bounding_box_offset_x[i], tile_bounding_box_offset_y[i], tile_bounding_box_offset_z[i], tile_bounding_box_scale_factor[i], tile_bounding_box_size_width[i], and tile_bounding_box_size_height[i] may represent tile_bounding_box_offset_x, tile_bounding_box_offset_y, tile_bounding_box_offset_z, tile_bounding_box_scale_factor, tile_bounding_box_size_width, and tile_bounding_box_size_height of the i-th tile in the for statement, respectively.

tile_bounding_box_offset_x[i] indicates the x offset of the i-th tile in the Cartesian coordinates. When the parameter is not present (namely, the tile_bounding_box_size_offset_x for the i-th tile that is not 0 is not present), the value of tile_bounding_box_offset_x[0] may be inferred to be sps_bounding_box_offset_x included in the SPS.

tile_bounding_box_offset_y[i] indicates the y offset of the i-th tile in the Cartesian coordinates. When the parameter is not present (namely, tile_bounding_box_size_offset_y for the i-th tile that is not 0 is not present), the value of tile_bounding_box_offset_y[0] may be inferred to be sps_bounding_box_offset_y included in the SPS.

tile_bounding_box_offset_z[i] indicates the z offset of the i-th tile in the Cartesian coordinates. When the parameter is not present (namely, tile_bounding_box_size_offset_z for the i-th tile that is not 0 is not present), the value of tile_bounding_box_offset_z[0] may be inferred to be sps_bounding_box_offset_z included in the SPS.

tile_bounding_box_size_width[i] indicates the width of the i-th tile in the Cartesian coordinates. When the parameter is not present (namely, tile_bounding_box_size_width for the i-th tile that is not 0 is not present), the value of tile_bounding_box_size_width[0] may be inferred to be sps_bounding_box_size_width included in the SPS.

tile_bounding_box_size_height[i] indicates the height of the i-th tile in the Cartesian coordinates. When the parameter is not present (namely, tile_bounding_box_size_height for the i-th tile that is not 0 is not present), the value of tile_bounding_box_size_height[0] may be inferred to be sps_bounding_box_size_height included in the SPS.

tile_bounding_box_size_depth[i] indicates the depth of the i-th tile in the Cartesian coordinates. When not present, the value of tile_bounding_box_size_depth[0] may be inferred to be sps_bounding_box_size_depth included in the SPS.

The tile inventory according to the embodiments may further include signaling information related to the operation of conversion of the point cloud data described above with reference to FIG. 24.

projection_flag may indicate that the conversion operation has been performed by the transmission device according to the embodiments. Accordingly, in response to projection_flag indicating that the conversion operation has been performed by the transmission device, the tile inventory according to the embodiments may further include signaling information related to the conversion operation described above with reference to FIG. 24. Also, in response to projection_flag indicating that the conversion operation has been performed by the transmission device, the reception device according to the embodiments may perform an inverse conversion operation. For example, projection_flag equal to 1 indicates that the conversion operation has been performed by the transmission device. projection_flag equal to 0 indicates that the conversion operation has not been performed by the transmission device.

The point cloud data transmission device according to the embodiments may transmit the bitstream in the form described above, thereby increasing compression efficiency and image quality performance and reducing the burden on the reception device.

FIG. 27 shows a structure of an attribute slice header (ash) of point cloud data according to embodiments.

A bitstream of point cloud data according to embodiments may include an attribute slice header (ash) (attribute_slice_header) including signaling information (or flags) shown in this figure. The attribute_slice_header shown in this figure may refer to the Attr_slice_header (ASH) 27005c described with reference to FIG. 23. The point cloud data reception device according to the embodiments may decode the point cloud data based on the signaling information (or flag information) shown in this figure.

ash_attr_parameter_set_id specifies the value of aps_attr_parameter_set_id of the active APS.

ash_attr_sps_attr_idx specifies the attribute set in the active SPS. The value of abh_attr_sps_attr_idx shall be in the range of 0 to sps_num_attribute_sets in the active SPS.

ash_attr_geom_slice_id specifies the value of geom_slice_id. It specifies the value of the gsh_slice_id of the active Geometry Slice Header.

ash_qp_delta_luma indicates information on luma of a quantization parameter of a slice identified by the ash.

ash_qp_delta_chroma indicates information on chroma of a quantization parameter of the slice identified by the ash.

The attribute slice header according to the embodiments may further include signaling information related to the operation of conversion of point cloud data described above with reference to FIG. 24.

projection_flag may indicate that the conversion operation has been performed by the transmission device according to the embodiments. Accordingly, in response to projection_flag indicating that the conversion operation has been performed by the transmission device, the attribute slice header according to the embodiments may further include signaling information related to the conversion operation described above with reference to FIG. 24. Also, in response to projection_flag indicating that the conversion operation has been performed by the transmission device, the reception device according to the embodiments may perform an inverse conversion operation. For example, projection_flag equal to 1 indicates that the conversion operation has been performed by the transmission device. projection_flag equal to 0 indicates that the conversion operation has not been performed by the transmission device.

The point cloud data transmission device according to the embodiments may transmit the bitstream in the form described above, thereby increasing compression efficiency and image quality performance and reducing the burden on the reception device.

Figure 28:
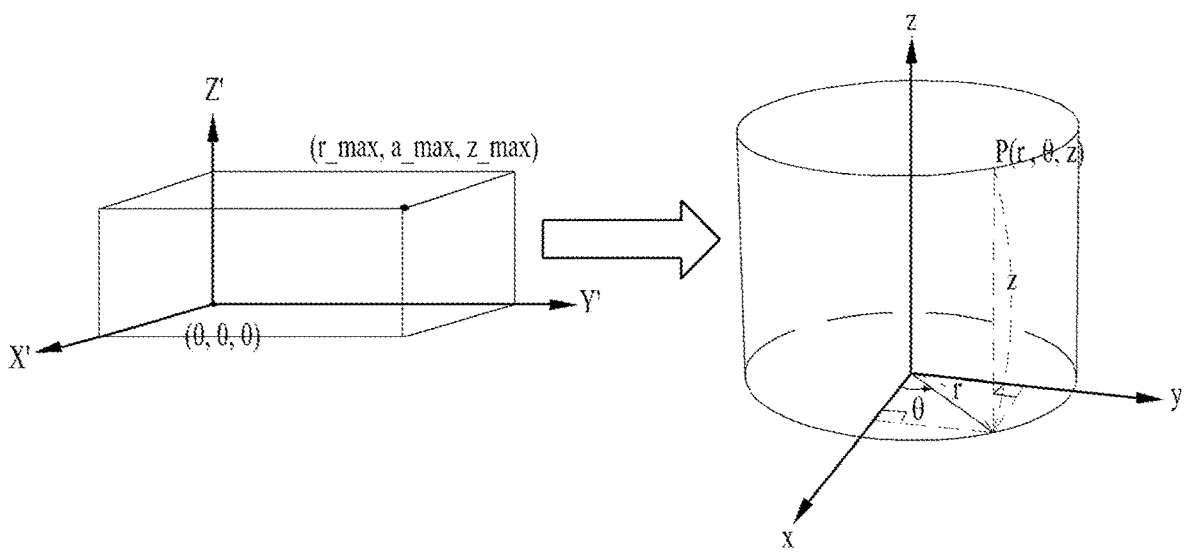
FIG. 28 illustrates an exemplary operation of coordinate reprojection of point cloud data according to embodiments.

FIG. 28 illustrates an exemplary operation of coordinate reprojection of point cloud data according to embodiments.

The point cloud data reception device according to the embodiments (e.g., the point cloud data reception device of FIGS. 1, 2, 10, 13 and 14) may perform an operation of inversely converting (or reconstructing) the point cloud data based on the signaling information (e.g., the signaling information related to the conversion operation described with reference to FIGS. 24 to 27). The inverse conversion operation may be an operation corresponding to the reverse of the conversion operation described with reference to FIGS. 15 to 23. That is, the reception device according to the embodiments may convert the points whose positions have been converted back into the positions before the conversion through the inverse conversion operation. The inverse conversion operation includes coordinate reprojection and/or coordinate conversion. This figure illustrates coordinate reprojection performed by the reception device according to embodiments. The coordinate reprojection may be an operation corresponding to the reverse of the coordinate projection operation described with reference to FIG. 17.

The reception device according to the embodiments may inversely convert the positions of the points based on the coordinates indicating the positions of the points presented in a new Cartesian coordinate system (e.g., the new Cartesian coordinate system described with reference to FIGS. 15 to 23). For example, the reception device may inversely convert the positions of the points by dividing each of the X' value, Y' value, and Z' value of the coordinates presented in the new Cartesian coordinate system by a scale value for each axis (e.g., the scale value described with reference to FIGS. 15 to 23). The reception device may present the coordinates indicating the inversely converted positions of the points in the cylindrical coordinate system (e.g., the cylindrical coordinate system described with reference to FIGS. 15 to 23). For example, the reception device may present the coordinates indicating the inversely converted positions of the points with parameters (e.g., r, θ, and z) representing the cylindrical coordinate system. The inverse conversion of the positions of the points by the reception device according to embodiments is represented as follows.

$$r=X'/\alpha; \theta=Y'/\beta; z=Z'/\gamma.$$

The reception apparatus according to the embodiments may change the positions of points based on a scale value for each axis according to the characteristic of distribution of the points. The scale value is the same as the scale value of FIG. 17, and thus a detailed description thereof will be omitted.

The reception device according to the embodiments may reconstruct the positions of the converted points through the inverse conversion operation. Accordingly, the reception device may perform decoding based on the converted points, but may reconstruct the points to render the original point cloud video.

Figure 29:
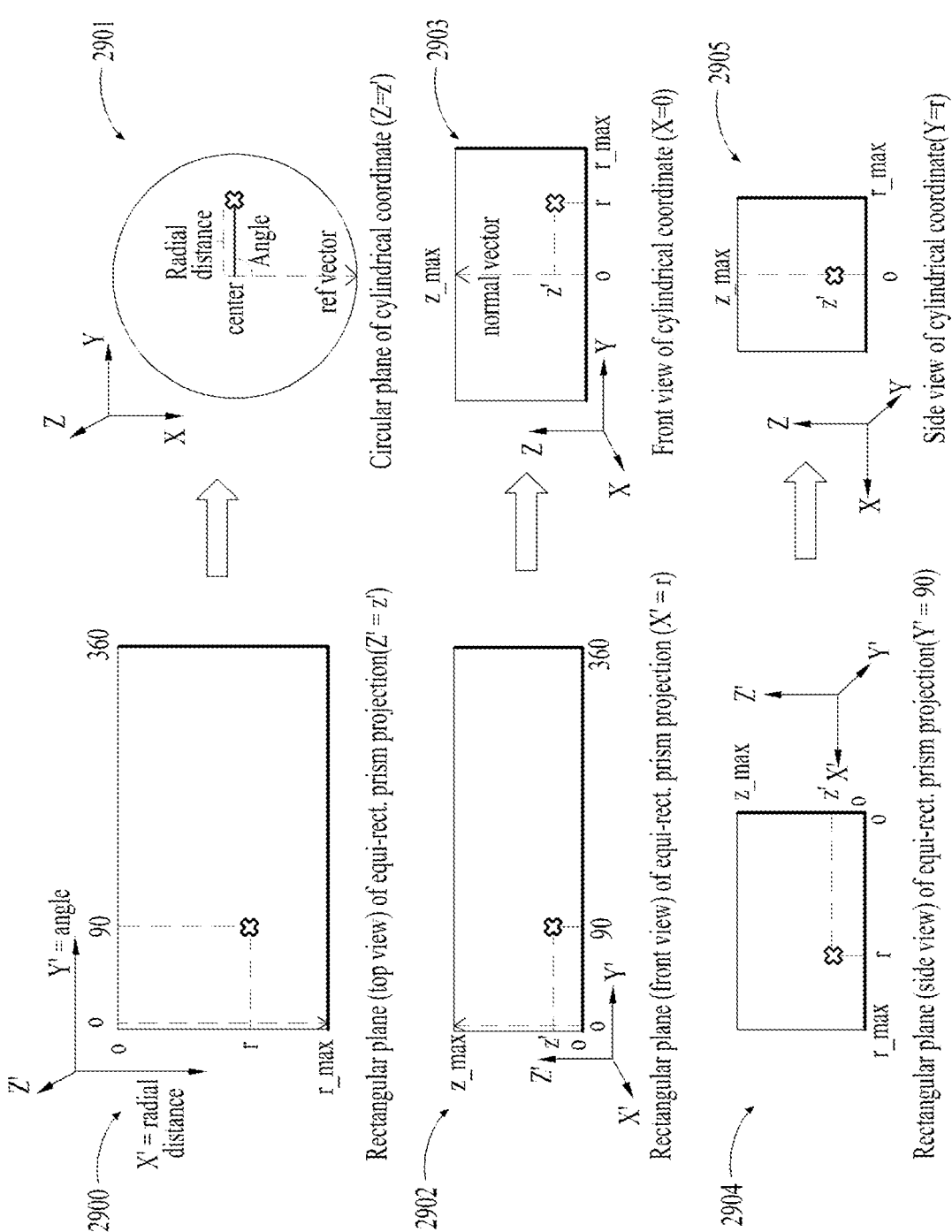
FIG. 29 illustrates an exemplary operation of coordinate projection of point cloud data according to embodiments.

FIG. 29 illustrates an exemplary operation of coordinate projection of point cloud data according to embodiments.

This figure illustrates an example of the inverse conversion of the point cloud data described above with reference to FIG. 28. The inverse conversion operation illustrated in this figure may be an operation corresponding to the reverse of the conversion operation described with reference to FIG. 18. The reception device may inversely convert the position of a point based on the converted coordinates of the point presented in a new Cartesian coordinate system. For example, the reception device may inversely convert the position of a point by dividing each of the X' value, Y' value, and Z' value of the converted coordinates (e.g., X'=r, Y'=90° and Z'=z') of the point presented in the new Cartesian coordinate system by a scale value (e.g., $\alpha=1$, $\beta=1$, and $\gamma=1$) for each axis.

The parts indicated by 2900 and 2901 are top views illustrating a process in which the reception device according to the embodiments inversely converts the position of a point in the new Cartesian coordinate system into cylindrical coordinates. The part 2900 is a top view showing a point (r, 90, z') in the new Cartesian coordinate system. The point (r, 90°, z') may be a point separated from the origin (0, 0, 0) by r along the X'-axis, 90 along the Y'-axis, and z' along the Z'-axis. Thus, in the top view, the point (r, 90, z') may be a point (r, 90, 0) in the X'Y' plane. The reception device according to the embodiments inversely convert the position of the point by dividing each of the X' value, Y' value, and Z' value of the point (r, 90, z') in the new Cartesian coordinate system by a scale value (e.g., $\alpha=1$, $\beta=1$, and $\gamma=1$) for each axis. The inversely converted position of the point may be represented in a cylindrical coordinate system. Accordingly, the inversely converted position of the point may be represented as (r, 90°, z') in the cylindrical coordinate system. The part 2901 is a top view of the point inversely converted into the cylindrical coordinate system. The inversely converted point may correspond to a vector that has a distance of r from the origin (0, 0, 0), and is rotated 90° from the x-axis (reference vector) in the xy-plane (reference plane). Thus, in the top view, the inversely converted point (r, 90°, z') may be (r, 90°, 0) in the xy-plane.

The parts indicated by 2902 and 2903 are front views illustrating a process in which the reception device according to the embodiments inversely converts the position of a point in the new Cartesian coordinate system into cylindrical coordinates. The part 2902 is a front view showing a point (r, 90, z') in the new Cartesian coordinate system. The point (r, 90°, z') may be a point separated from the origin (0, 0, 0) by r along the X'-axis, 90 along the Y'-axis, and z' along the Z'-axis. Thus, in the front view, the point (r, 90, z') may be a point (0, 90, z') in the Y'Z' plane. The reception device according to the embodiments inversely convert the position of the point by dividing each of the X' value, Y' value, and Z' value of the point (r, 90, z') in the new Cartesian coordinate system by a scale value (e.g., α=1, β=1, and γ=1) for each axis. The inversely converted position of the point may be represented in a cylindrical coordinate system. Accordingly, the inversely converted position of the point may be represented as (r, 90°, z') in the cylindrical coordinate system. The part 2903 is a front view of the point inversely converted into the cylindrical coordinate system. The inversely converted point may correspond to a vector that has a distance of r from the origin (0, 0, 0), and is rotated 90° from the x-axis (reference vector) in the xy-plane (reference plane). Thus, in the front view, the inversely converted point (r, 90°, z') may be (0, r, z') in the yz-plane.

The parts indicated by 2904 and 2905 are side views illustrating a process in which the reception device according to the embodiments inversely converts the position of a point in the new Cartesian coordinate system into cylindrical coordinates. The part 2904 is a side view showing a point (r, 90, z') in the new Cartesian coordinate system. The point (r, 90°, z') may be a point separated from the origin (0, 0, 0) by r along the X'-axis, 90 along the Y'-axis, and z' along the Z'-axis. Thus, in the side view, the point (r, 90, z') may be a point (r, θ, z') in the X'Z' plane. The reception device according to the embodiments inversely convert the position of the point by dividing each of the X' value, Y' value, and Z' value of the point (r, 90, z') in the new Cartesian coordinate system by a scale value (e.g., α=1, β=1, and γ=1) for each axis. The inversely converted position of the point may be represented in a cylindrical coordinate system. Accordingly, the inversely converted position of the point may be represented as (r, 90°, z') in the cylindrical coordinate system. The part 2905 is a side view of the point inversely converted into the cylindrical coordinate system. The inversely converted point may correspond to a vector that has a distance of r from the origin (0, 0, 0), and is rotated 90° from the x-axis (reference vector) in the xy-plane (reference plane). Thus, in the side view, the inversely converted point (r, 90°, z') may be (0, 0, z') in the xz plane.

As described above, the reception device according to the embodiments may inversely convert the positions of points into the cylindrical coordinate system using the scale values for the respective axes.

Figure 30:
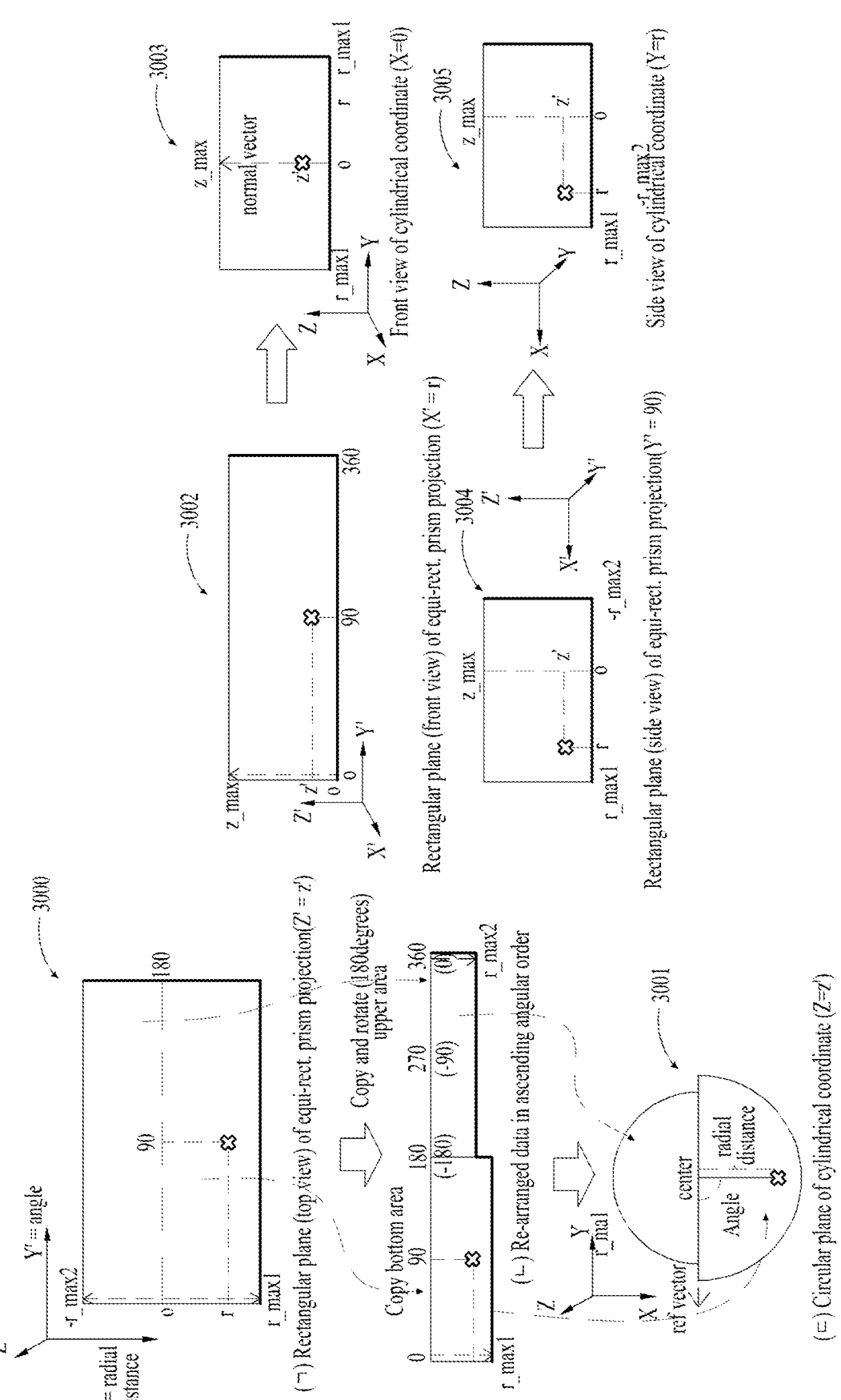
FIG. 30 illustrates an exemplary operation of coordinate projection of point cloud data according to embodiments.

FIG. 30 illustrates an exemplary operation of coordinate projection of point cloud data according to embodiments.

This figure illustrates an exemplary operation of inverse conversion performed by the reception device according to embodiments based on a second coordinate system corresponding to a set of one or more coordinate systems. The second coordinate system corresponding to a set of one or more coordinate systems is the same as that described with reference to FIG. 19. The inverse conversion illustrated in this figure may be an operation corresponding to the reverse of the conversion operation described with reference to FIG. 19. The reception device according to the embodiments may perform the inverse conversion by dividing each of the X' value, Y' value, and Z' value of the converted coordinates (e.g., X'=r, Y'=90° and Z'=z') of a point presented in the new Cartesian coordinate system by a scale value (e.g., α=1, β=1, and γ=1) for each axis.

The parts indicated by 3000 and 3001 are top views illustrating a process in which the reception device according to the embodiments inversely converts the position of a point in the new Cartesian coordinate system into the above-described second coordinate system. The part 3000 is a top view showing a point (r, 90, z') in the new Cartesian coordinate system. The point (r, 90, z') may be a point separated from the origin (0, 0, 0) by r along the X'-axis, 90 along the Y'-axis, and z' along the Z'-axis. Thus, in the top view, the point (r, 90, z') may be a point (r, 90) in the X'Y' plane. The reception device according to the embodiments inversely convert the position of the point by dividing each of the X' value, Y' value, and Z' value of the point (r, 90, z') in the new Cartesian coordinate system by a scale value (e.g., α=1, β=1, and γ=1) for each axis. The inversely converted position of the point may be represented in the second coordinate system. Accordingly, the inversely converted position of the point may be represented as (r, 90°, z') in the second coordinate system. The part 3001 is a top view of the point inversely converted into the second coordinate system. The inversely converted point may correspond to a vector that has a distance of r from the origin (0, 0, 0), and is rotated 90° from the y-axis (reference vector) in the xy-plane (reference plane). Thus, in the top view, the inversely converted point (r, 90°, z') may be (r, 0) in the xy-plane.

The parts indicated by 3002 and 3003 are front views illustrating a process in which the reception device according to the embodiments inversely converts the position of a point in the new Cartesian coordinate system into the above-described second coordinate system. The part 3002 is a front view showing a point (r, 90, z') in the new Cartesian coordinate system. The point (r, 90, z') may be a point separated from the origin (0, 0, 0) by r along the X'-axis, 90 along the Y'-axis, and z' along the Z'-axis. Thus, in the front view, the point (r, 90, z') may be a point (90, z') in the Y'Z' plane. The reception device according to the embodiments inversely convert the position of the point by dividing each of the X' value, Y' value, and Z' value of the point (r, 90, z') in the new Cartesian coordinate system by a scale value (e.g., α=1, f3=1, and γ=1) for each axis. The inversely converted position of the point may be represented in the second coordinate system. Accordingly, the inversely converted position of the point may be represented as (r, 90°, z') in the second coordinate system. The part 3003 is a front view of the point inversely converted into the second coordinate system. The inversely converted point may correspond to a vector that has a distance of r from the origin (0, 0, 0), and is rotated 90° from the y-axis (reference vector) in the xy-plane (reference plane). Thus, in the front view, the inversely converted point (r, 90°, z') may be (0, z') in the yz-plane.

The parts indicated by 3004 and 3005 are side views illustrating a process in which the reception device according to the embodiments inversely converts the position of a point in the new Cartesian coordinate system into the above-described second coordinate system. The part 3004 is a side view showing a point (r, 90, z') in the new Cartesian coordinate system. The point (r, 90, z') may be a point separated from the origin (0, 0, 0) by r along the X'-axis, 90 along the Y'-axis, and z' along the Z'-axis. Thus, in the side view, the point (r, 90, z') may be a point (r, z') in the X'Z' plane. The reception device according to the embodiments inversely convert the position of the point by dividing each of the X' value, Y' value, and Z' value of the point (r, 90, z') in the new Cartesian coordinate system by a scale value (e.g., α=1, β=1, and γ=1) for each axis. The inversely converted position of the point may be represented in the second coordinate system. Accordingly, the inversely converted position of the point may be represented as (r, 90°, z') in the second coordinate system. The part 3005 is a side view of the point inversely converted into the second coordinate system. The inversely converted point may correspond to a vector that has a distance of r from the origin (0, 0, 0), and is rotated 90° from the y-axis (reference vector) in the xy-plane (reference plane). Thus, in the side view, the inversely converted point (r, 90°, z') may be (r, z') in the xz plane.

Figure 31:
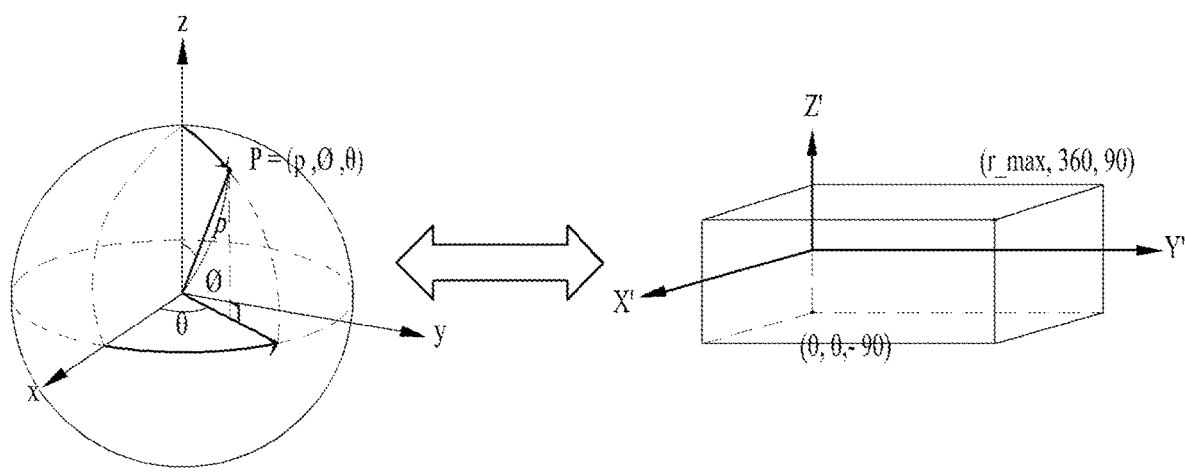
FIG. 31 illustrates an exemplary operation of coordinate conversion of point cloud data according to embodiments.

FIG. 31 illustrates an exemplary operation of coordinate conversion of point cloud data according to embodiments.

This figure illustrates coordinate reprojection performed by the reception device according to embodiments. The inverse conversion described in this figure may be an operation corresponding to the reverse of the conversion operation described with reference to FIG. 20.

The reception device according to the embodiments may inversely convert the positions of the points based on the coordinates indicating the positions of the points presented in a new Cartesian coordinate system (shown on the right side in this figure) (e.g., the new Cartesian coordinate system described with reference to FIGS. 15 to 23). For example, the reception device may inversely convert the positions of the points by dividing each of the X' value, Y' value, and Z' value of the coordinates presented in the new Cartesian coordinate system by a scale value for each axis (e.g., the scale value described with reference to FIGS. 15 to 23). The reception device may present the coordinates indicating the inversely converted positions of the points in the spherical coordinate system (shown on the left side in this figure) (e.g., the spherical coordinate system described with reference to FIGS. 15 to 23). For example, the reception device may present the coordinates indicating the inversely converted positions of the points with parameters (e.g., ρ, Φ, and θ) representing the spherical coordinate system. The inverse conversion of the positions of the points by the reception device according to embodiments is represented as follows.

$$\rho=X'/\alpha;\Phi=Y'/\beta;\theta=Z'/\gamma.$$

The reception device according to the embodiments may change the positions of points based on a scale value for each axis according to the characteristic of distribution of the points. The scale value is the same as the scale value of FIG. 17, and thus a detailed description thereof will be omitted.

The reception device according to the embodiments may reconstruct the positions of the converted points through the inverse conversion operation. Accordingly, the reception device may perform decoding based on the converted points, but may reconstruct the points to render the original point cloud video.

Figure 32:
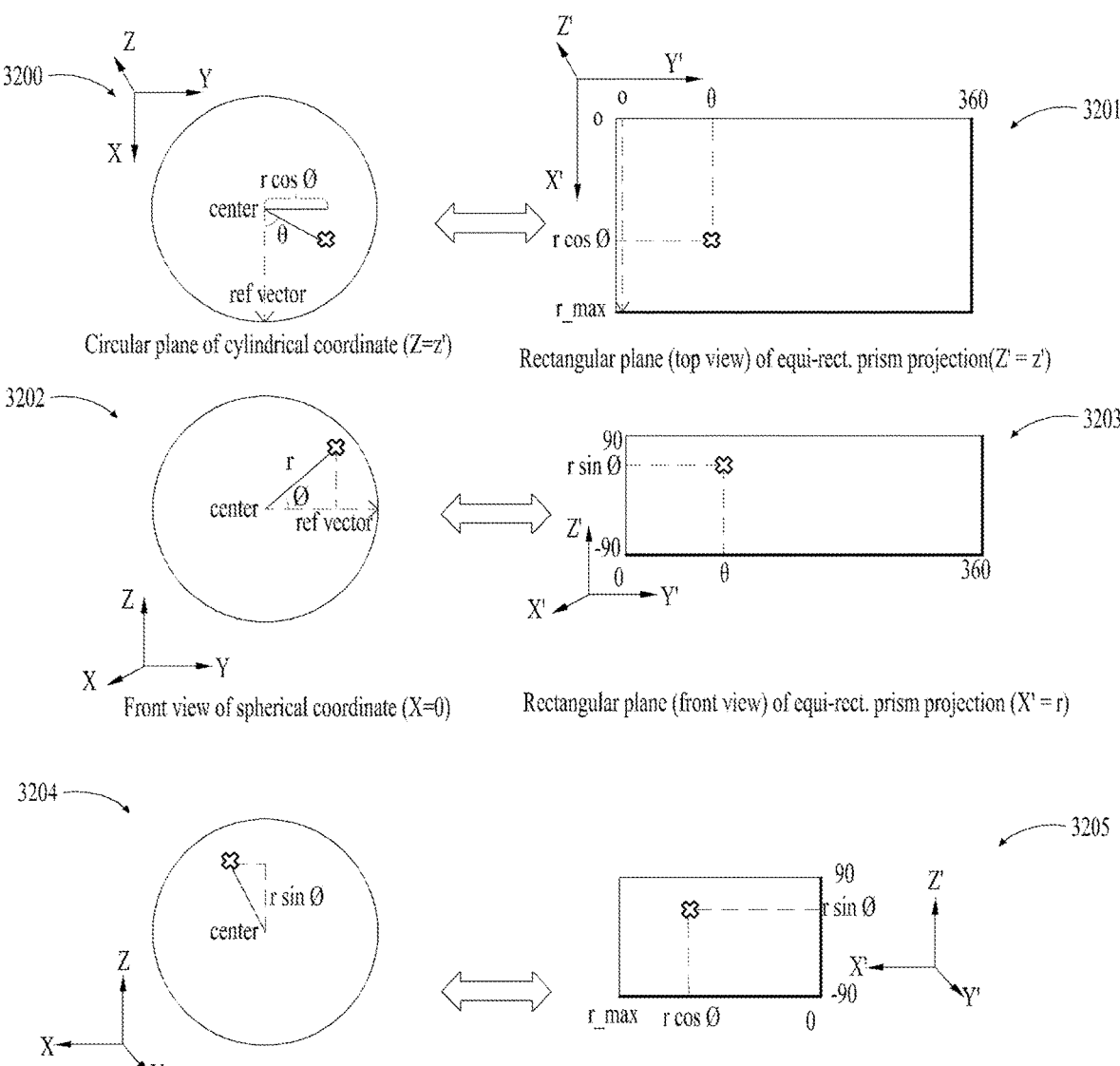
FIG. 32 is a flowchart including an operation of inverse conversion of point cloud data according to embodiments.

FIG. 32 is a flowchart including an operation of inverse conversion of point cloud data according to embodiments.

This figure illustrates inverse conversion performed by the reception device according to embodiments. The inverse conversion illustrated in this figure may be an operation corresponding to the reverse of the conversion operation described with reference to FIG. 21. The reception device according to the embodiments may perform the inverse conversion by dividing each of the X' value, Y' value, and Z' value of the converted coordinates (e.g., X'=r, Y'=0, and Z'=1) of a point presented in the new Cartesian coordinate system by a scale value (e.g., α=1, β=1, and γ=1) for each axis.

The parts indicated by 3200 and 3201 are top views illustrating a process in which the reception device according to the embodiments inversely converts the position of a point in the new Cartesian coordinate system into the spherical coordinate system. The part 3201 is a top view showing a point (r, Φ, θ) in the new Cartesian coordinate system. The point (r, Φ, θ) may be a point separated from the origin (0, 0, 0) by r along the X'-axis, θ along the Y'-axis, and Φ along the Z'-axis. Thus, in the top view, the point (r, Φ, θ) may be a point (r cost, 0) in the X'Y' plane. The reception device according to the embodiments inversely convert the position of the point by dividing each of the X' value, Y' value, and Z' value of the point (r, Φ, θ) in the new Cartesian coordinate system by a scale value (e.g., α=1, β=1, and γ=1) for each axis. The inversely converted position of the point may be represented in the spherical coordinate system. Accordingly, the inversely converted position of the point may be represented as (r, Φ, θ) in the spherical coordinate system. The part 3200 is a top view of the point inversely converted into the spherical coordinate system. The inversely converted point may correspond to a vector that has a distance of r from the origin (0, 0, 0), and is rotated by θ from the x-axis (reference vector) in the xy-plane (reference plane) and vertically rotated by Φ from the xy-plane. Thus, in the top view, the inversely converted point (r, Φ, θ) may be (r cos Φ cos θ, r cos Φ) in the xy-plane.

The parts indicated by 3202 and 3203 are front views illustrating a process in which the reception device according to the embodiments converts the position of a point in the new Cartesian coordinate system into the spherical coordinate system. The part 3203 is a front view showing a point (r, Φ, θ) in the new Cartesian coordinate system. The point (r, Φ, θ) may be a point separated from the origin (0, 0, 0) by r along the X'-axis, θ along the Y'-axis, and Φ along the Z'-axis. Thus, in the front view, the point (r, Φ, θ) may be a point (θ, r sin Φ) in the Y'Z' plane. The reception device according to the embodiments inversely convert the position of the point by dividing each of the X' value, Y' value, and Z' value of the point (r, Φ, θ) in the new Cartesian coordinate system by a scale value (e.g., α=1, β=1, and γ=1) for each axis. The inversely converted position of the point may be represented in the spherical coordinate system. Accordingly, the inversely converted position of the point may be represented as (r, Φ, θ) in the spherical coordinate system. The part 3202 is a front view of the point inversely converted into the spherical coordinate system. The inversely converted point may correspond to a vector that has a distance of r from the origin (0, 0, 0), and is rotated by θ from the x-axis (reference vector) in the xy-plane (reference plane) and vertically rotated by Φ from the xy-plane. Thus, in the front view, the inversely converted point (r, Φ, θ) may be (r cos Φ sin θ, r sin Φ) in the yz-plane.

The parts indicated by 3204 and 3205 are side views illustrating a process in which the reception device according to the embodiments converts the position of a point in the new Cartesian coordinate system into the spherical coordinate system. The part 3205 is a side view showing a point (r, Φ, θ) in the new Cartesian coordinate system. The point (r, Φ, θ) may be a point separated from the origin (0, 0, 0) by r along the X'-axis, θ along the Y'-axis, and Φ along the Z'-axis. Thus, in the side view, the point (r, Φ, θ) may be a point (r cos Φ, r sin Φ) in the X'Z' plane. The reception device according to the embodiments inversely convert the position of the point by dividing each of the X' value, Y' value, and Z' value of the point (r, Φ, θ) in the new Cartesian coordinate system by a scale value (e.g., α=1, β=1, and γ=1) for each axis. The inversely converted position of the point may be represented in the spherical coordinate system. Accordingly, the inversely converted position of the point may be represented as (r, Φ, θ) in the spherical coordinate system. The part 3204 is a side view of the point inversely converted into the spherical coordinate system. The inversely converted point may correspond to a vector that has a distance of r from the origin (0, 0, 0), and is rotated by θ from the x-axis (reference vector) in the xy-plane (reference plane) and vertically rotated by Φ from the xy-plane. Thus, in the side view, the inversely converted point (r, Φ, θ) may be (r cos Φ cos θ, r sin Φ) in the xz plane.

As described above, the reception device according to the embodiments may inversely convert (or reconstruct) the positions of the points using the scale values for the respective axes.

Figure 33:
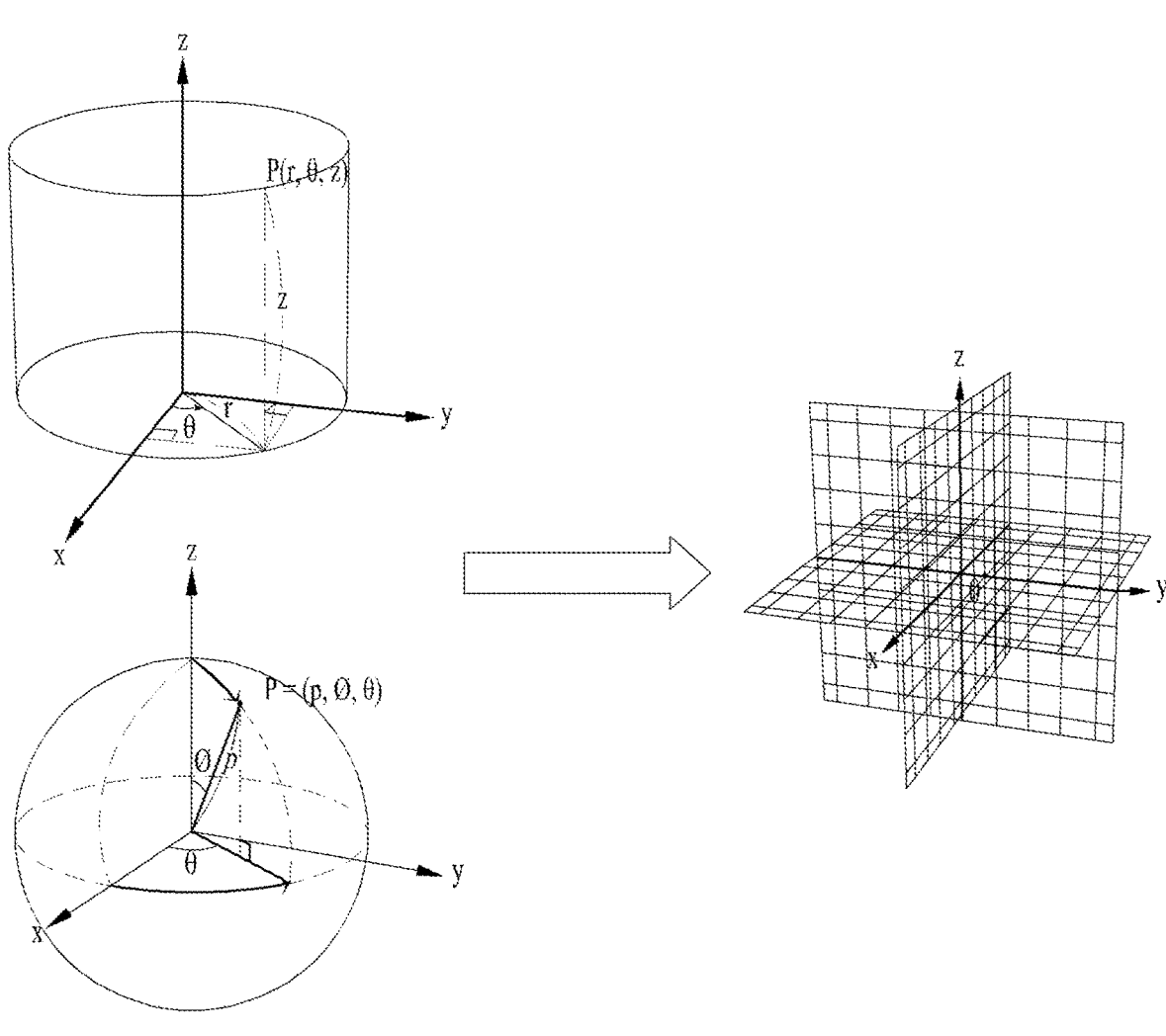
FIG. 33 illustrates an exemplary operation of coordinate conversion of point cloud data according to embodiments.

FIG. 33 illustrates an exemplary operation of coordinate conversion of point cloud data according to embodiments.

The reception device (e.g., the point cloud data reception device of FIGS. 1, 2, 10, 13 and 14) according to the embodiments may perform a coordinate conversion operation on the point cloud data on which the coordinate reprojection (e.g., the coordinate reprojection described with reference to FIGS. 28 to 32) has been performed. The coordinate conversion illustrated in this figure may be an operation corresponding to the reverse of the coordinate conversion operation described with reference to FIG. 16. The reception device according to the embodiments may convert the coordinates indicating the positions of points of the point cloud data presented in the second coordinate system into the first coordinate system. The first coordinate system and the second coordinate system are the same as those described with reference to FIG. 16.

The reception device according to the embodiments may convert the coordinates indicating the positions of points presented in the cylindrical coordinate system into the Cartesian coordinate system. That is, the reception device may convert the coordinates indicating the positions of the points represented by parameters (e.g., r, θ, and z) representing the cylindrical coordinate system into parameters (e.g., x-axis, y-axis, and z-axis) representing the Cartesian coordinate system. For example, the operation of the reception device of converting the values of r, θ, and z in the cylindrical coordinate system into the x-axis value, y-axis value, and z-axis value in the Cartesian coordinate system is represented as follows.

$$x=r \cos \theta; y=r \sin \theta; z=z.$$

The reception device according to the embodiments may convert c the coordinates indicating the positions of points presented in the spherical coordinate system into the Cartesian coordinate system. That is, the reception device may convert the coordinates indicating the positions of the points represented by parameters (e.g., ρ, Φ, and θ) representing the spherical coordinate system into parameters (e.g., x-axis, y-axis, and z-axis) representing the Cartesian coordinate system. For example, the operation of the reception device of converting the values of ρ, Φ, and θ in the spherical coordinate system into the x-axis value, the y-axis value, and the z-axis value in the Cartesian coordinate system is represented as follows.

$$x=\rho \sin \Phi \cos \theta; y=\rho \sin \Phi \sin \theta; z=\rho \cos \Phi.$$

As described above, the reception device according to the embodiments may convert coordinates indicating positions of points presented in the cylindrical coordinate system or the spherical coordinate system into the Cartesian coordinate system and used the converted coordinates in attribute coding (e.g., the attribute coding in FIGS. 1 to 14) and/or rendering.

FIG. 34 is a flowchart including an operation of inverse conversion of point cloud data according to embodiments.

This figure is a flowchart illustrating inverse conversion of point cloud data (e.g., the inverse conversion operation described with reference to FIGS. 28 to 34) performed by the reception device (e.g., the point cloud data reception device of FIGS. 1, 2, 10, 13 and 14) according to the embodiments. The flowchart in this figure may correspond to the reverse of the flowchart including the conversion operation described with reference to FIG. 22.

The reception device according to the embodiments may receive a bitstream including a geometry bitstream and an attribute bitstream based on converted geometry (or new geometry). The reception device may receive the bitstream and perform a decoding procedure (3400a).

The reception device (e.g., the arithmetic decoder 13007 or the arithmetic decoder 11000) according to the embodiments may decode the geometry bitstream based on arithmetic coding.

The reception device (e.g., the inverse quantizer 11006, etc.) according to the embodiments inversely quantizes the decoded attribute bitstream or information on the attributes secured as a result of decoding, and then inversely quantizes the inversely quantized attributes (or attribute values). The inverse quantization may be selectively applied based on the attribute encoding performed by the point cloud encoder.

The reception device (e.g., the point cloud data decoder described with reference to FIGS. 1 to 14) according to the embodiments may decode the point cloud data.

The reception device according to the embodiments may perform an inverse conversion operation on the decoded point cloud data. That is, the reception device according to the embodiments may inversely convert positions of points based on the coordinates indicating the positions of the points presented in a new Cartesian coordinate system (or a third coordinate system). The coordinates indicating the inversely converted positions of the points may be presented in the second coordinate system. The reception device may convert the coordinates indicating the positions of the points presented in the second coordinate system into the first coordinate system.

The reception device according to the embodiments may perform a coordinate reprojection operation of inversely converting the positions of the points based on the coordinates indicating the positions of the points presented in the new Cartesian coordinate system and a scale value for each axis (3400). The coordinate reprojection operation is the same as that described with reference to FIGS. 28 to 32, and thus a detailed description thereof will be omitted. The coordinate reprojection may be an operation corresponding to the reverse of the coordinate projection operation described with reference to FIGS. 17 to 21.

The reception device according to the embodiments may perform a coordinate conversion operation of converting coordinates indicating the positions of the points presented in the second coordinate system (e.g., the spherical coordinate system or the cylindrical coordinate system) into the first coordinate system (e.g., the Cartesian coordinate system) (3401). The coordinate conversion operation is the same as that described with reference to FIGS. 16 and 33, and thus a detailed description thereof will be omitted.

The reception device according to the embodiments may receive a bitstream including an attribute bitstream that is based on the converted geometry (or the new geometry) and a geometry bitstream that is based on the unconverted geometry. The reception device may receive the bitstream and perform a decoding procedure (3400b).

The reception device according to the embodiments may receive a bitstream and perform geometry decoding (e.g., geometry decoding described with reference to FIGS. 1 to 14). The decoded geometry according to the embodiments may be a geometry (or geometry data) based on an unconverted geometry.

The reception device according to the embodiments may perform a conversion operation on the decoded geometry data (3402). The conversion operation is the same as or similar to the conversion operation described with reference to FIGS. 15 to 22. That is, the reception device may perform the conversion operation and/or the inverse conversion operation.

The reception device according to the embodiments may perform attribute decoding (e.g., the attribute decoding described with reference to FIGS. 1 to 14) based on the converted geometry and/or the attribute bitstream. Accordingly, the decoded attribute according to the embodiments may be an attribute (or attribute data) based on the converted geometry (or new geometry).

The reception device according to the embodiments may perform the inverse conversion operation on the decoded attribute data (3403). The inverse conversion operation is the same as the inverse conversion operations 3400 and 3401 described above. The reception device may output point cloud data through the inverse conversion operation based on the positions (or geometry) of points given before the conversion.

The reception device according to the embodiments may receive a bitstream including a geometry bitstream that is based on a converted geometry (or a new geometry) and an attribute bitstream that is based on an unconverted geometry. The reception device may receive the bitstream and perform a decoding procedure (3400$c$).

The reception device according to the embodiments may receive the bitstream and perform geometry decoding (e.g., the geometry decoding described with reference to FIGS. 1 to 14). The decoded geometry may be a geometry (or geometry data) that is based on the converted geometry.

The reception device according to the embodiments may perform an inverse conversion operation on the decoded geometry data (3404). The inverse conversion operation is the same as the inverse conversion operations 3400 and 3401 described above.

The reception device according to the embodiments may perform attribute decoding (e.g., the attribute decoding described with reference to FIGS. 1 to 14) based on the inversely converted geometry and/or the attribute bitstream. Accordingly, the reception device may output, through the inverse conversion operation, point cloud data that is based on the positions (or geometries) of the points before the conversion.

The reception device according to the embodiments may reconstruct the original positions of the points through the above-described inverse conversion operation and use the same for attribute decoding and/or rendering. Accordingly, the reception device may change (or convert) the distribution (or positions) of points through the conversion operation and/or the inverse conversion operation, thereby increasing decoding efficiency and adjusting latency in the decoding operation.

Figure 35:
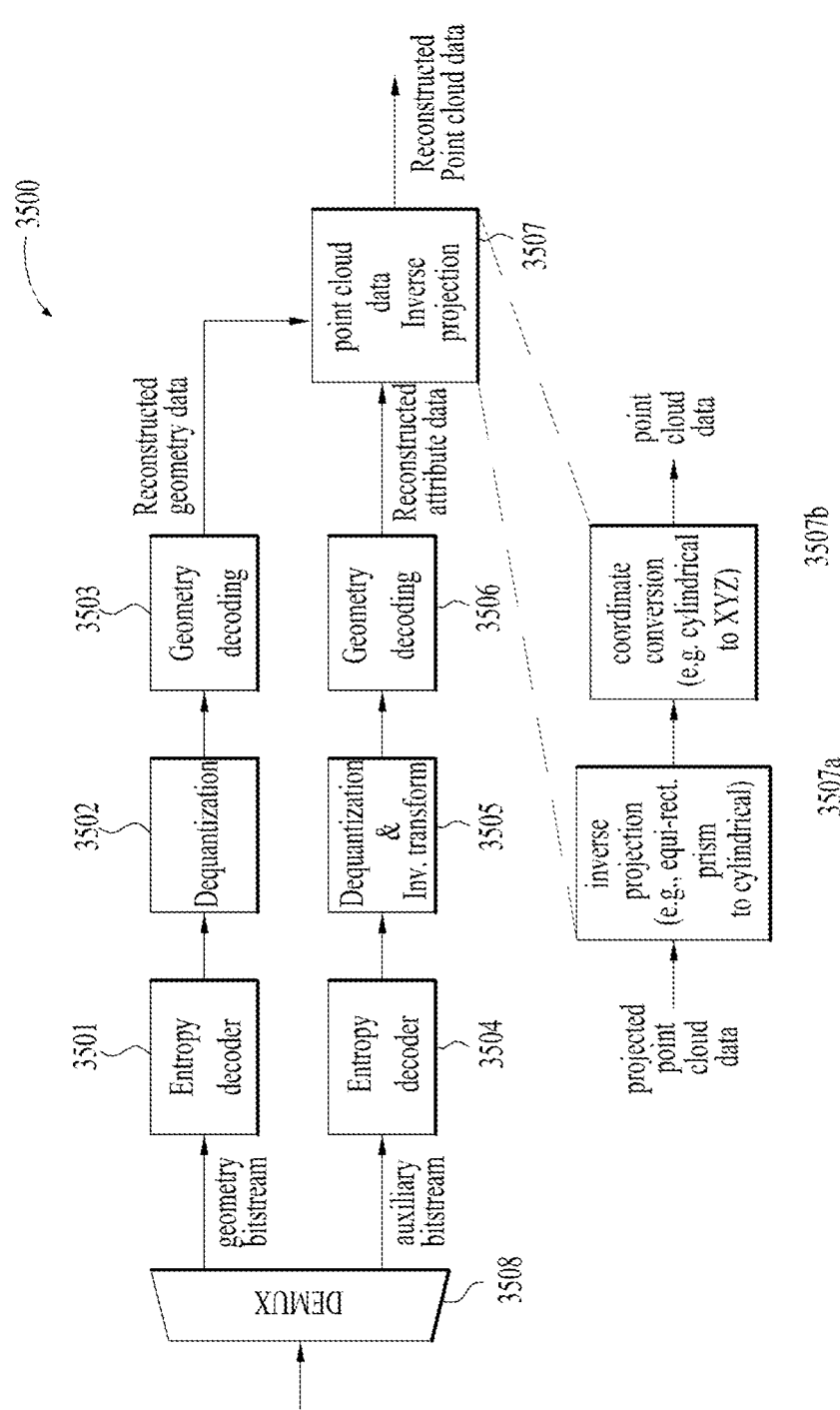
FIG. 35 is a block diagram illustrating a point cloud data reception device according to embodiments.

FIG. 35 is a block diagram illustrating a point cloud data reception device according to embodiments.

A point cloud data reception device 3500 according to the embodiments may perform an operation corresponding to the reverse of the operation of the point cloud data transmission device 1500 described with reference to FIG. 15.

The point cloud data reception device (e.g., the point cloud data reception device of FIGS. 1, 2, 10, 13 and 14) according to the embodiments illustrated in this figure may perform the decoding operation described with reference to FIGS. 1 to 33. Also, the point cloud data reception device may consume the point cloud content using the conversion operation and/or the inverse conversion operation described with reference to FIGS. 15 to 34. The reception device includes an entropy decoder 3501, a dequantizer 3502, a geometry decoder 3503, an entropy decoder 3504, a dequantizer 3505, an attribute decoder 3506, and an inverse projector 3507, and/or a demultiplexer 3508. Although not shown in this figure, the point cloud data reception device may further include one or more elements configured to perform the decoding operation described with reference to FIGS. 1 to 34. Each element in this figure may correspond to hardware, software, a processor, and/or a combination thereof.

The demultiplexer receives a point cloud data bitstream (e.g., the bitstream of FIGS. 24 to 27). The point cloud data bitstream includes a geometry bitstream, an attribute bitstream, and/or an auxiliary bitstream.

The entropy decoder 3501 may perform entropy decoding (e.g., the entropy coding described with reference to FIGS. 1 to 14) on the geometry bitstream of the point cloud data bitstream.

The dequantizer 3502 inversely quantizes information on the geometry bitstream and outputs inversely quantized geometries (or geometry values). The inverse quantization may be optionally applied based on the geometry encoding performed by the point cloud encoder.

The geometry decoder according to the embodiments may receive the geometry bitstream and perform the geometry decoding described with reference to FIGS. 1 to 34. Also, the geometry decoder may perform the geometry decoding based on the conversion operation and/or the inverse conversion operation described with reference to FIGS. 15 to 34. The geometry decoder may output geometry data reconstructed as a result of the geometry decoding.

The entropy decoder 3504 may perform entropy decoding (e.g., the entropy coding described with reference to FIGS. 1 to 14) on the attribute bitstream of the point cloud data bitstream.

The dequantizer 3505 inversely quantizes information on the attribute bitstream and outputs inversely quantized attributes (or attribute values). The inverse quantization may be optionally applied based on the attribute encoding performed by the point cloud encoder.

The attribute decoder according to the embodiments may receive the attribute bitstream and perform the attribute decoding described with reference to FIGS. 1 to 34. Also, the attribute decoder may perform the attribute decoding based on the conversion operation and/or the inverse conversion operation described with reference to FIGS. 15 to 34. The attribute decoder may output attribute data reconstructed as a result of the attribute decoding.

The inverse projector according to the embodiments may inversely convert (or reconstruct) the positions of points of the point cloud data. The inverse projector may perform the inverse conversion operation described with reference to FIGS. 28 to 34.

The inverse projector according to the embodiments may include a coordinate reprojection unit 3507$a$ and/or a coordinate conversion unit 3507$b$. The inverse projector may further include one or more elements configured to perform the operation of inversely converting the positions of the points.

The coordinate reprojection unit may inversely convert the positions of the points based on coordinates indicating the positions of the points presented in a new Cartesian coordinate system (e.g., the new Cartesian coordinate system described with reference to FIGS. 15 to 23). The operation of the coordinate reprojection unit of inversely converting the positions of the points has been described in detail above with reference to FIGS. 28 to 32.

The coordinate conversion unit according to the embodiments may convert the coordinates indicating the positions of the points of the point cloud data presented in a second coordinate system (e.g., the second coordinate system of FIG. 16) into a first coordinate system (e.g., the first coordinate system of FIG. 16). The operation of the coordinate conversion unit of converting the coordinates has been described in detail above with reference to FIG. 33.

The point cloud data reception device according to embodiments may perform the conversion operation and/or the inverse conversion operation based on signaling information related to the conversion operation. That is, the signaling information about the conversion operation described with reference to FIG. 23 may be signaling information about the inverse conversion operation. Accordingly, the point cloud data reception device according to the embodiments may perform the conversion operation and/or the inverse conversion operation to adjust latency in the decoding operation or perform more accurate rendering according to the characteristics of the point cloud data. Thereby, it may provide the user with point cloud content suitable for the reception environment.

Figure 36:
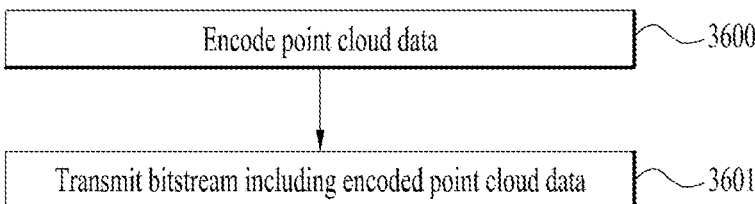
FIG. 36 is a block diagram illustrating a method of transmitting point cloud data according to embodiments.

FIG. 36 is a block diagram illustrating a method of transmitting point cloud data according to embodiments.

This figure illustrates a method of transmitting point cloud data by a point cloud data transmission device (e.g., the point cloud data transmission device of FIGS. 1, 2, 4, 11, 12 and 15) according to embodiments. The point cloud data transmission device may perform the same or similar operation to the encoding operation described with reference to FIGS. 1 to 35.

The point cloud data transmission device may encode the point cloud data (3600). The point cloud data transmission device includes a geometry encoder configured to encode geometry representing positions of one or more points of the point cloud data, and an attribute encoder configured to encode attributes of the one or more points. The point cloud data transmission device may further include a projector configured to convert positions of points for at least one of the geometry encoder and the attribute encoder. The geometry encoder may perform the same or similar operation to the geometry encoding operation described with reference to FIGS. 1 to 35. The attribute encoder may perform the same or similar operation to the attribute encoding operation described with reference to FIGS. 1 to 35. The projector may perform the same or similar operation to that of the projector 1507 described with reference to FIGS. 15 to 35.

The conversion operation according to the embodiments may include an operation of converting coordinates indicating the positions of points presented in a first coordinate system into a second coordinate system, and an operation of converting the positions of the points based on the converted coordinates indicating the positions of the points presented in the second coordinate system. The coordinate conversion unit 1507*b* of FIG. 15 may perform the operation of converting the coordinates indicating the positions of the points presented in the above-described first coordinate system into the second coordinate system. The coordinate projection unit of FIG. 15 may perform the operation of converting the positions of the points based on the converted coordinates indicating the positions of the points presented in the above-described second coordinate system. The first coordinate system and the second coordinate system according to the embodiments are the same as or similar to the first coordinate system and the second coordinate system described with reference to FIGS. 15 to 35. The first coordinate system may include a Cartesian coordinate system, and the second coordinate system may include a spherical coordinate system or a cylindrical coordinate system. The operation of converting the positions of the points may be based on coordinates indicating the positions of the points converted into the second coordinate system and scale values. The scale values are the same as or similar to the scale values for the respective axes described with reference to FIGS. 15 to 35.

The point cloud data transmission device according to the embodiments may transmit a bitstream including the encoded point cloud data (3601). The bitstream may include signaling information related to the conversion operation. The bitstream according to the embodiments is the same as or similar to the bitstream described with reference to FIGS. 23 to 27.

Figure 37:
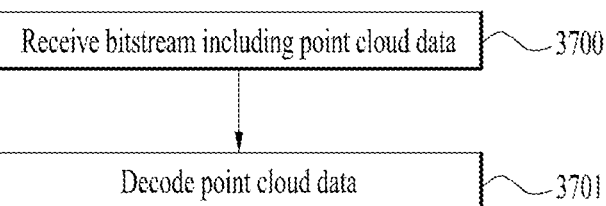
FIG. 37 is a block diagram illustrating a method of receiving point cloud data according to embodiments.

FIG. 37 is a block diagram illustrating a method of receiving point cloud data according to embodiment.

This figure illustrates a method of receiving point cloud data by a point cloud data reception device (e.g., the point cloud data reception device of FIGS. 1, 2, 10, 13, and 24) according to embodiments. The point cloud data transmission device may perform the same or similar operation to the decoding operation described with reference to FIGS. 1 to 35.

The point cloud data reception device according to embodiments may receive a bitstream including point cloud data (2800). The bitstream may include signaling information related to the inverse conversion operation. The bitstream according to the embodiments is the same as or similar to the bitstream described with reference to FIGS. 23 to 27.

The point cloud data reception device may decode the point cloud data (2801). The point cloud data reception device may include a geometry decoder configured to decode geometry representing positions of one or more points of the point cloud data, and an attribute decoder configured to decode attributes of the one or more points. The point cloud data reception device may further include a reprojector configured to inversely convert positions of points for at least one of the geometry decoder and the attribute decoder. The geometry decoder may perform the same or similar operation to the geometry decoding operation described with reference to FIGS. 1 to 35. The attribute decoder may perform the same or similar operation to the attribute encoding operation described with reference to FIGS. 1 to 35. The re-projector may perform an operation which is the same as or similar to that of the re-projector 3507 described with reference to FIGS. 15 to 35.

The inverse conversion operation according to the embodiments includes an operation of inversely converting the positions of points based on coordinates indicating the positions of the points, and an operation of converting coordinates indicating the positions of the points presented in a second coordinate system into a first coordinate system. The coordinates indicating the inversely converted positions of the points may be presented in the second coordinate system. The coordinate reprojection unit 3507*a* of FIG. 35 may perform the operation of inversely converting the positions of the points based on the coordinates indicating the positions of the points. The coordinate conversion unit 3507*b* of FIG. 35 may perform the operation of converting the coordinates indicating the positions of the points presented in the second coordinate system into the first coordinate system. The first coordinate system and the second coordinate system are the same as or similar to the first coordinate system and the second coordinate system described with reference to FIGS. 15 to 35. The first coordinate system may include a Cartesian coordinate system, and the second coordinate system may include a spherical coordinate system or a cylindrical coordinate system. The operation of inversely converting the positions of the points may be based on the coordinates indicating the positions of the points presented in the second coordinate system, and scale values. The scale values are the same as or similar to the scale values for the respective axes described with reference to FIGS. 15 to 35.

The embodiments have been described in terms of a method and/or a device, and the description of the methods and the description of the devices may be complementary to each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted to indicate "and/or." For instance, the expression "A/B" may mean "A and/or B," and "A, B" may mean "A and/or B." Further, "A/B/C" may mean "at least one of A, B, and/or C." Also, "A/B/C" may mean "at least one of A, B, and/or C." Further, in the document, the term "or" should be interpreted as indicating "and/or." For instance, the expression "A or B" may mean 1) only "A," 2) only "B," or 3) "A and B." In other words, the term "or" in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

MODE FOR DISCLOSURE

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that variously changes or modifications can be made to the embodiments within the scope of the embodiments.

Thus, it is intended that the embodiments cover the modifications and variations of this disclosure provided they come within the scope of the appended claims and their equivalents.

The invention claimed is:

1. A method comprising:
converting position information of point cloud data along X, Y and Z axes into angular coordinates for an origin of the X, Y, and Z axis based on scale factors;
encoding geometry data of point cloud data based on an octree;
encoding attribute data of the point cloud data; and
generating a bitstream including the encoded point cloud data,
wherein the bitstream includes information related to the scale factors used in conversion for the angular coordinates for the point cloud data,
wherein the bitstream further includes tile inventory information of a tile for the point cloud data,
wherein the tile inventory information includes XYZ coordinates of a tile bounding box and a size of the tile bounding box,
wherein values for each of the angular coordinates are offset based on maximum values related to each of the angular coordinates, and
wherein the information related to the scale factors are specified for each of the angular coordinates.

2. The method of claim 1, wherein the encoding geometry data of the point cloud data comprises:
performing entropy encoding the geometry data representing positions of one or more points of the point cloud data.

3. The method of claim 1, wherein the converting comprises:
converting coordinates representing the positions of the points presented in a first coordinate system into a second coordinate system; and
converting the positions of the points based on the converted coordinates representing the positions of the points presented in the second coordinate system.

4. The method of claim 3, wherein:
the first coordinate system comprises a Cartesian coordinate system; and
the second coordinate system comprises a spherical coordinate system or a cylindrical coordinate system.

5. The method of claim 4, wherein the bitstream includes signaling information about the conversion.

6. A device comprising:
a memory; and
at least one processor connected to the memory, the at least one processor configured to:
convert position information of point cloud data along X, Y and Z axes into angular coordinates for an origin of the X, Y, and Z axis based on scale factors;
encode geometry data of point cloud data based on an octree;
encode attribute data of the point cloud data; and
generate a bitstream including the point cloud data,
wherein the bitstream includes information related to the scale factors used in conversion for the angular coordinates for the point cloud data,
wherein the bitstream further includes tile inventory information of a tile for the point cloud data,
wherein the tile inventory information includes XYZ coordinates of a tile bounding box and a size of the tile bounding box, wherein values for each of the angular coordinates are is offset based on maximum values related to each of the angular coordinates, and
wherein the information related to the scale factors are specified for each of the angular coordinates.

7. The device of claim 6, wherein the processor is further configured to:
perform entropy encoding the geometry data representing positions of one or more points of the point cloud data.

8. A method comprising:
decoding geometry data of point cloud data based on an octree in a bitstream;
decoding attribute data of the point cloud data in the bitstream; and
performing conversion for angular coordinates for the point cloud data based on scale factors,
wherein the bitstream includes information related to the scale factors used in the conversion for the angular coordinates for the point cloud data,
wherein the bitstream further includes tile inventory information of a tile for the point cloud data,
wherein the tile inventory information includes XYZ coordinates of a tile bounding box and a size of the tile bounding box,
wherein values for each of the angular coordinates are is offset based on maximum values related to each of the angular coordinates, and
wherein the information related to the scale factors are specified for each of the angular coordinates.

9. The method of claim 8, wherein the decoding the geometry data of the point cloud data comprises:
decoding the geometry data representing positions of one or more points of the point cloud data.

10. The method of claim 8, further comprising:
inversely converting the positions of the points based on coordinates representing the positions of the points, wherein coordinates representing the inversely converted positions of the points are presented in a second coordinate system; and
converting the coordinates representing the positions of the points presented in the second coordinate system into a first coordinate system.

11. The method of claim 10, wherein:
the first coordinate system comprises a Cartesian coordinate system; and
the second coordinate system comprises a spherical coordinate system or a cylindrical coordinate system.

12. The method of claim 11, wherein the inverse conversion of the positions of the points comprises:
inversely converting the positions of the points based on the coordinates representing the positions of the points presented in the second coordinate system, and a scale value.

13. The method of claim 12, wherein the bitstream includes signaling information about the inverse conversion.

14. A device comprising:
a memory; and
at least one processor connected to the memory, the at least one processor configured to:
decode geometry data of point cloud data based on an octree in a bitstream;
decode attribute data of the point cloud data in the bitstream; and
perform conversion for angular coordinates for the point cloud data based on scale factors, wherein the bitstream includes information related to the scale factors used in the conversion for the angular coordinates for the point cloud data, wherein the bitstream further includes tile inventory information of a tile for the point cloud data, wherein the tile inventory information includes XYZ coordinates of a tile bounding box and a size of the tile bounding box, wherein values for each of the angular coordinates are offset based on maximum values related to each of the angular coordinates, and wherein the information related to the scale factors are specified for each of the angular coordinates.

15. The device of claim 14, wherein the processor is further configured to:

decode geometry data representing positions of one or more points of the point cloud data.

* * * * *